United States Patent
Miyazawa et al.

(10) Patent No.: US 8,446,383 B2
(45) Date of Patent: May 21, 2013

(54) INFORMATION PROCESSING APPARATUS, OPERATION PREDICTION METHOD, AND OPERATION PREDICTION PROGRAM

(75) Inventors: Yusuke Miyazawa, Tokyo (JP); Tatsushi Nashida, Kanagawa (JP); Fuminori Homma, Tokyo (JP)

(73) Assignee: Sony Corporation, Tokyo (JP)

( * ) Notice: Subject to any disclaimer, the term of this patent is extended or adjusted under 35 U.S.C. 154(b) by 93 days.

(21) Appl. No.: 12/983,522

(22) Filed: Jan. 3, 2011

(65) Prior Publication Data

US 2011/0175832 A1 Jul. 21, 2011

(30) Foreign Application Priority Data

Jan. 19, 2010 (JP) .................................. 2010-009181
Sep. 6, 2010 (JP) .................................. 2010-199349

(51) Int. Cl.
*G06F 3/041* (2006.01)
(52) U.S. Cl.
USPC ...... 345/173; 345/156; 178/18.01; 178/18.03
(58) Field of Classification Search
USPC .................... 345/156–184; 178/18.01–19.04
See application file for complete search history.

(56) References Cited

U.S. PATENT DOCUMENTS

| | | | | |
|---|---|---|---|---|
| 7,786,980 B2 * | 8/2010 | Lashina | | 345/173 |
| 8,134,579 B2 * | 3/2012 | Lee et al. | | 345/661 |
| 2003/0189211 A1 * | 10/2003 | Dietz | | 257/79 |
| 2008/0018604 A1 * | 1/2008 | Paun et al. | | 345/168 |
| 2008/0278450 A1 * | 11/2008 | Lashina | | 345/173 |
| 2009/0122018 A1 * | 5/2009 | Vymenets et al. | | 345/173 |
| 2009/0174684 A1 * | 7/2009 | Ryu et al. | | 345/173 |
| 2009/0237372 A1 * | 9/2009 | Kim et al. | | 345/173 |
| 2009/0244019 A1 * | 10/2009 | Choi | | 345/173 |
| 2009/0295715 A1 * | 12/2009 | Seo et al. | | 345/156 |
| 2009/0312101 A1 * | 12/2009 | Pope | | 463/36 |
| 2010/0020035 A1 * | 1/2010 | Ryu et al. | | 345/173 |
| 2010/0026723 A1 * | 2/2010 | Nishihara et al. | | 345/671 |
| 2010/0107099 A1 * | 4/2010 | Frazier et al. | | 715/765 |
| 2010/0169772 A1 * | 7/2010 | Stallings et al. | | 715/702 |
| 2011/0018811 A1 * | 1/2011 | Miernik | | 345/173 |

FOREIGN PATENT DOCUMENTS

JP 2009-116583 5/2009

OTHER PUBLICATIONS

U.S. Appl. No. 13/196,963, filed Aug. 3, 2011, Miyazawa, et al.
U.S. Appl. No. 13/166,129, filed Jun. 22, 2011, Homma, et al.

* cited by examiner

*Primary Examiner* — Dmitriy Bolotin
(74) *Attorney, Agent, or Firm* — Oblon, Spivak, McClelland, Maier & Neustadt, L.L.P.

(57) ABSTRACT

An information processing apparatus includes: a touch detection unit detecting touch of an instruction object on an operation surface; a proximity detection unit detecting proximity of the instruction object to the operation surface; and a control unit detecting movement of the instruction object on or to the operation surface based on the detection result of the touch detection unit and the detection result of the proximity detection unit and starting a process corresponding to an input operation predicted from the detected movement of the instruction object.

14 Claims, 24 Drawing Sheets

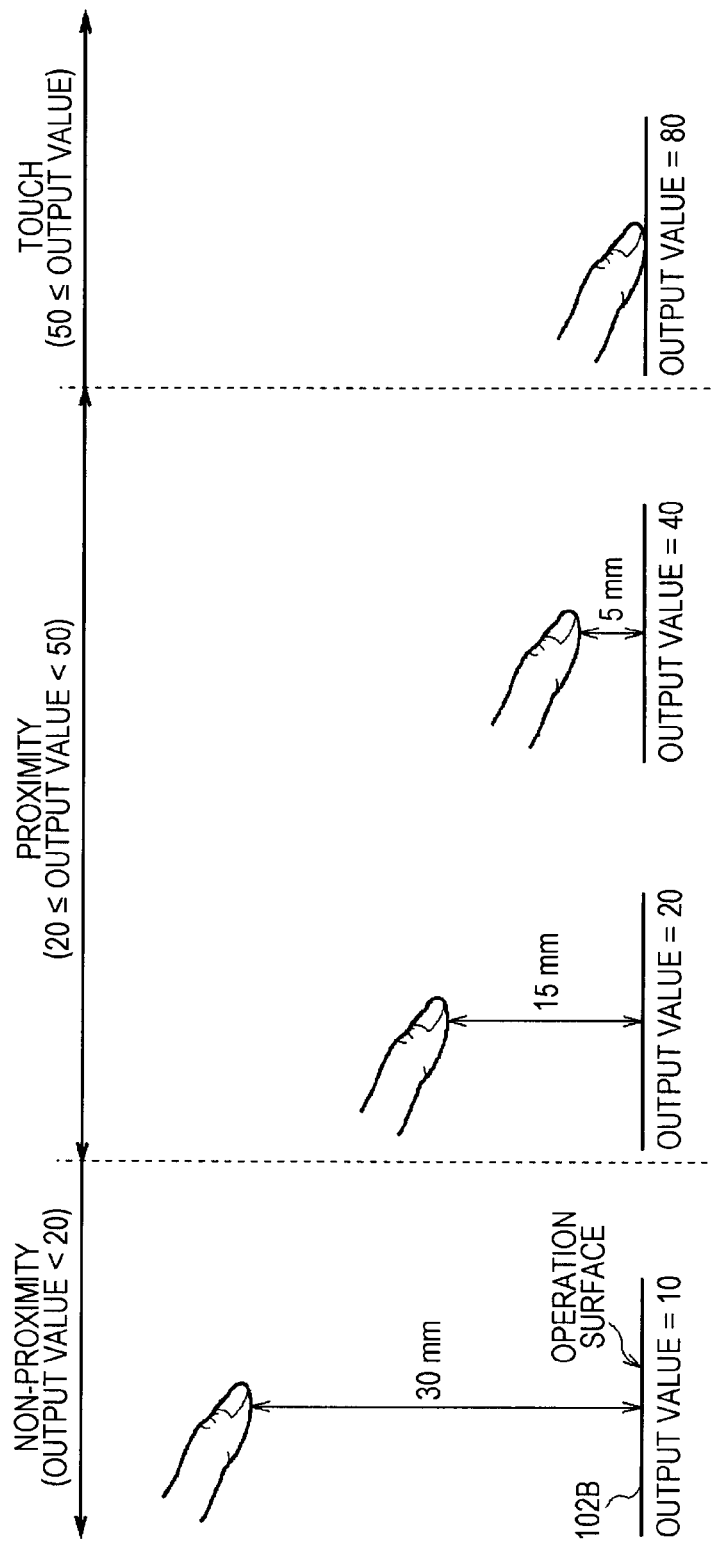

▓ TOUCH PART (50 ≤ OUTPUT VALUE)
▨ PROXIMITY PART (20 ≤ OUTPUT VALUE < 50)
☐ NON-PROXIMITY PART (OUTPUT VALUE < 20)
× TOUCH POSITION, PROXIMITY POSITION

PRESSING FORCE

INFORMATION PROCESSING APPARATUS, OPERATION PREDICTION METHOD, AND OPERATION PREDICTION PROGRAM

BACKGROUND OF THE INVENTION

1. Field of the Invention

The present invention relates to an information processing apparatus, an operation prediction method, and an operation prediction program and is applicable to an information processing apparatus including, for example, a touch panel.

2. Description of the Related Art

In recent years, information processing apparatuses including a touch panel have come into wide use. The information processing apparatus including a touch panel detects touch of an instruction object (a finger, a touch pen, or the like) and performs various reception processes as input operations in response to the touch panel.

In recent years, an information processing apparatus capable of detecting not only the touch of an instruction object on a touch panel but also a distance between the touch panel and the instruction object has been suggested (for example, see Japanese Unexamined Patent Application Publication No. 2009-116583).

In the information processing apparatus, when a plurality of instruction items are displayed on a touch screen including a touch panel and a liquid crystal panel and a finger approaches the touch screen up to a given distance, the instruction item at the position which is the nearest to the finger is enlarged and displayed. When the finger touches the enlarged and displayed instruction item (that is, when the instruction item is touched with the finger), the information processing apparatus performs a process corresponding to the instruction item.

Thus, in such an information processing apparatus, even when a screen of the touch screen is small, the instruction item can be confirmed with ease and can also be touched with ease, thereby not only miniaturizing the size but also improving operability.

SUMMARY OF THE INVENTION

In recent years, however, the processing load of an information processing apparatus has a tendency to increase with the increase in the amount of data processed by the information processing apparatus. Therefore, in an information processing apparatus according to the related art, it may take some time to confirm the processing result corresponding to an input operation, for example, after the input operation on a touch panel is performed.

For example, it takes several seconds to display the subsequent image after an operation of displaying the subsequent image on the touch panel is performed.

Thus, in the information processing apparatus according to the related art, responsiveness to the input operation may not necessarily be good.

It is desirable to provide an information processing apparatus, an operation prediction method, and an operation prediction program improving responsiveness to an input operation compared to those according to the related art.

According to an embodiment of the invention, there is provided an information processing apparatus including: a touch detection unit detecting touch of an instruction object on an operation surface; a proximity detection unit detecting proximity of the instruction object to the operation surface; and a control unit detecting movement of the instruction object on or to the operation surface based on the detection result of the touch detection unit and the detection result of the proximity detection unit and starting a process corresponding to an input operation predicted from the detected movement of the instruction object.

By predicting the input operation from the movement of an instruction object on or to the operation surface and starting a process corresponding to the input operation, it is possible to shorten the period from when a user actually performs the input operation to when the corresponding process ends.

According to the embodiment of the invention, by predicting the input operation from the movement of an instruction object on or to the operation surface and starting a process corresponding to the input operation, it is possible to shorten the period from when a user actually performs the input operation to when the corresponding process ends. Accordingly, the information processing apparatus, the operation prediction method, and the operation prediction program improving responsiveness to the input operation compared to those according to the related art can be embodied.

BRIEF DESCRIPTION OF THE DRAWINGS

FIG. 4 is a schematic diagram illustrating a variation in an output value of an electrostatic sensor.

DESCRIPTION OF THE PREFERRED EMBODIMENTS

Hereinafter, preferred embodiments (hereinafter, referred to as embodiments) of the invention will be described. The description will be made in the following order.

1. First Embodiment
2. Second Embodiment
3. Third Embodiment
4. Other Embodiments 1. First Embodiment 1-1. Overview of First Embodiment First, the overview of the first embodiment will be described. A specific example of the first embodiment will be described after the overview is described.

Figure 1:
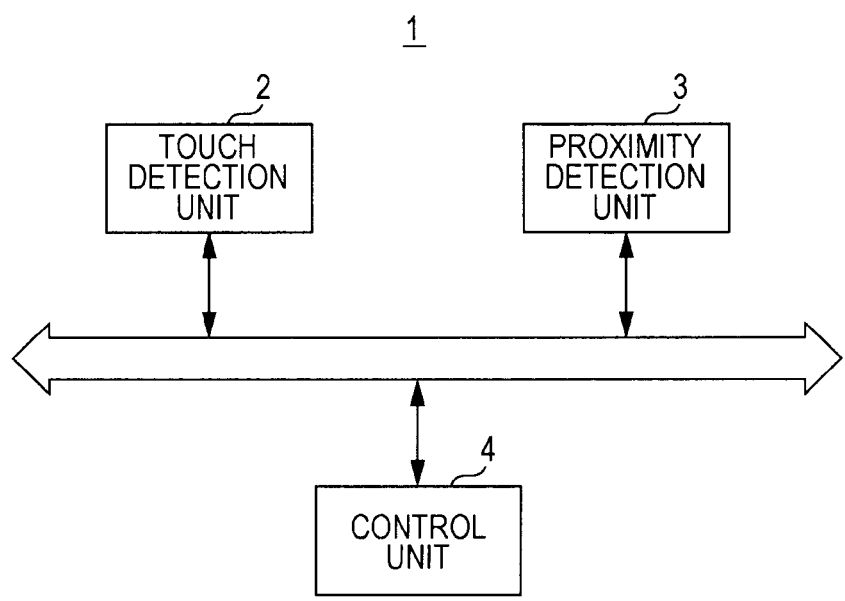
FIG. 1 is a block diagram illustrating the overall functional configuration of an information processing apparatus according to a first embodiment.

In FIG. 1, Reference Numeral 1 denotes an information processing apparatus. The information processing apparatus 1 includes a touch detection unit 2 detecting touch of an instruction object on an operation surface (for example, an operation surface of a touch panel) and a proximity detection unit 3 detecting proximity of the instruction object to the operation surface.

The information processing apparatus 1 also includes a control unit 4 which detects the movement of the instruction object on or to the operation surface based on the detection result of the touch detection unit 2 and the detection result of the proximity detection unit 3, and starts a process corresponding to an input operation predicted from the detected movement of the instruction object.

The information processing apparatus 1 predicts the input operation from the movement of the instruction object on or to the operation surface and starts the process corresponding to the corresponding input operation. Accordingly, it is possible to shorten the period from when a user actually performs the input operation to when the corresponding process ends.

More specifically, the control unit 4 predicts that an input operation is performed by the instruction object, when the detected movement of the instruction object is predetermined movement.

The control unit 4 predicts that an input operation of touching the operation surface with the instruction object is performed, when the detected movement of the instruction object is the predetermined movement.

At this time, the control unit 4 determines the predetermined movement based on, for example, a movement speed and a movement direction of the instruction object.

For example, the control unit 4 predicts that the input operation of touching the operation surface with the instruction object is performed, when the instruction object approaches the operation surface in a direction perpendicular to the operation surface at a speed equal to or faster than a predetermined speed.

For example, the control unit 4 predict that an input operation of flicking the operation surface with the instruction object is performed when the instruction object approaches the operation surface in an inclination direction of the operation surface at the speed equal to or faster than the predetermined speed.

Moreover, the control unit 4 determines whether the movement of the instruction object is predetermined movement, based on, for example, the movement speed and the movement direction of the instruction object and a distance between the instruction object and the operation surface.

For example, the control unit 4 predicts that the input operation of touching the operation surface with the instruction object is performed, when the distance between the instruction object and the operation surface is equal to or less than a predetermined distance and the movement speed of the instruction object in a direction parallel to the operation surface is equal to or less than the predetermined speed.

Moreover, the control unit 4 may start background processing among processes corresponding to the input operation, when predicting that the input operation is performed.

Moreover, the control unit 4 may stop the background processing when the background processing starts and then a predetermined period elapses, but the predicted input operation is not performed.

Moreover, the control unit 4 may perform processing other than the background processing, when the predicted input operation is performed.

A specific example of the information processing apparatus 1 having the above configuration will be described in detail below.

Figure 2:
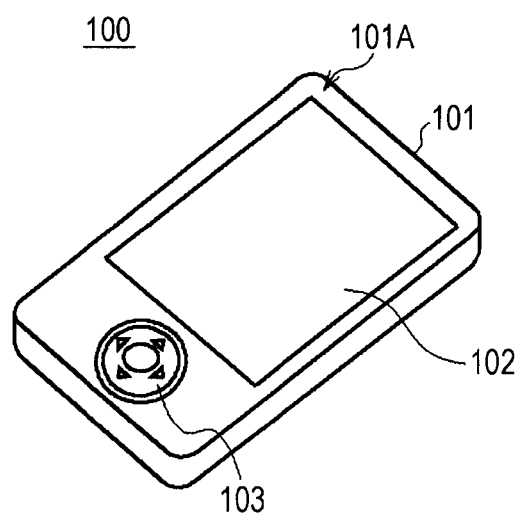
FIG. 2 is a schematic diagram illustrating the outer configuration of a portable terminal which is a specific example according to the first embodiment.

1-2. Specific Example of First Embodiment 1-2-1. Outer Configuration of Portable Terminal Next, the outer configuration of a portable terminal 100 which is a specific example of the above-described information processing apparatus 1 will be described with reference to FIG. 2.

The portable terminal 100 includes a casing 101 with an approximately flat rectangular shape of a size such that it is able to be grasped with one hand.

A rectangular touch screen 102 is disposed in the middle portion of a front surface 101A of the casing 101. The touch screen 102 includes a liquid crystal panel and a thin transparent touch panel covering a display surface of the liquid crystal panel. The touch panel can be, for example, an electrostatic capacity type multi-touch panel.

The portable terminal 100 receives a touch operation and a proximity operation on and to the touch screen 102 by a finger (a touch pen or the like can be used) as an input operation. The touch operation refers to an operation (which is also referred to as a touch operation) performed when the touch screen is touched with a finger. The proximity operation refers to an operation performed when the touch screen is not touched with a finger and is in proximity to a finger.

On the front surface 101A of the casing 101 of the portable terminal 100, an operation button 103 is also disposed in the vicinity of the touch screen 102.

The portable terminal 100 can be used when the rectangular touch screen 102 is oriented in a vertically long direction (which is also referred to as a vertical direction) or is oriented in a horizontally long direction (which is also referred to as a horizontal direction). Hereinafter, a casing where the portable terminal 100 is used in the vertical direction will be described.

1-2-2. Hardware Configuration of Portable Terminal

Figure 3:
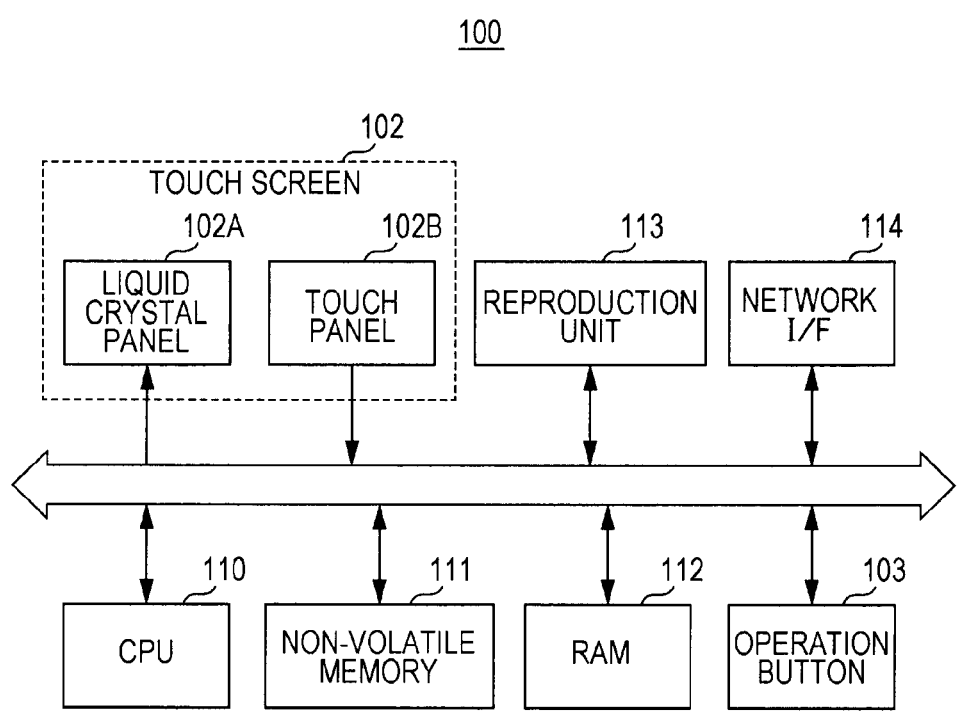
FIG. 3 is a block diagram illustrating the hardware configuration of the portable terminal.

Next, the hardware configuration of the portable terminal 100 will be described with reference to FIG. 3. In the portable terminal 100, a CPU 110 develops a program stored in a non-volatile memory 111 into a RAM 112 and reads the program to perform various processes according to this program and control each unit. A central processing unit is abbreviated to CPU and a random access memory is abbreviated to RAM.

When recognizing the touch operation or the proximity operation on or to the touch screen 102, the CPU 110 receives this operation as an input operation and performs processing according to an input operation.

The touch screen 102 includes a liquid crystal panel 102A which is a display device displaying various kinds of information and a touch panel 102B which is an input operation device receiving an input operation.

The touch panel 102B is an electrostatic capacity type touch panel, as described above, and has a plurality of electrostatic sensors (not shown) arranged in a lattice form on the operation surface. In each of the plurality of electrostatic sensors, an output value varies depending on the electrostatic capacity varying as a conductor such as a finger approaches the operation surface.

As shown in FIG. 4, suppose that a finger is actually approaching the operation surface of the touch panel 102B. At this time, for example, the output value of the electrostatic sensor located directly below the finger varies to "10", "20", and "40" when the distance between the operation surface and the finger is 30 mm, 15 mm, and 5 mm, respectively. The output value of the electrostatic sensor varies to the maximum value "80" when the operation surface is touched with the finger.

The CPU 110 acquires the varied output values of the electrostatic sensors and the positions of the electrostatic sensors from the touch panel 102B. Based on the output values and the positions of the electrostatic sensors, the CPU 110 distinguishes a part touched with a finger on the operation surface of the touch panel 102B, a part in the proximity of a finger to the operation surface, and a part which is neither touched or in the proximity of a finger from each other. Hereinafter, the part touched with a finger is referred to as a touch part, the part in the proximity of a finger is referred to as a proximity part, and the part which is neither touched or in the proximity of a finger is referred to as a non-proximity part.

Figure 5A:
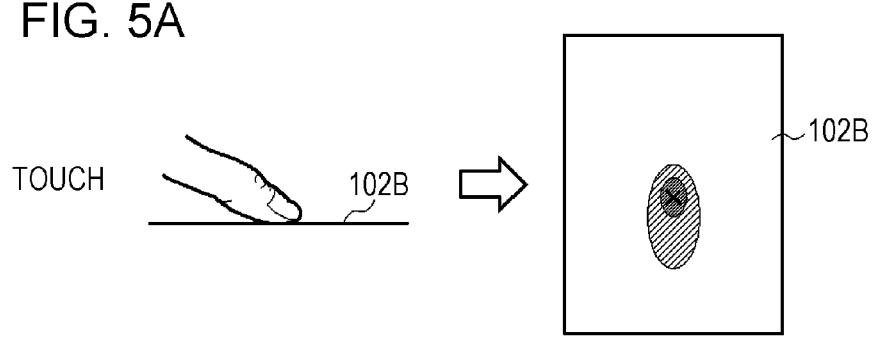
FIGS. 5A and 5B are schematic diagrams for describing detection of a touch position and a proximity position.
Figure 5B:
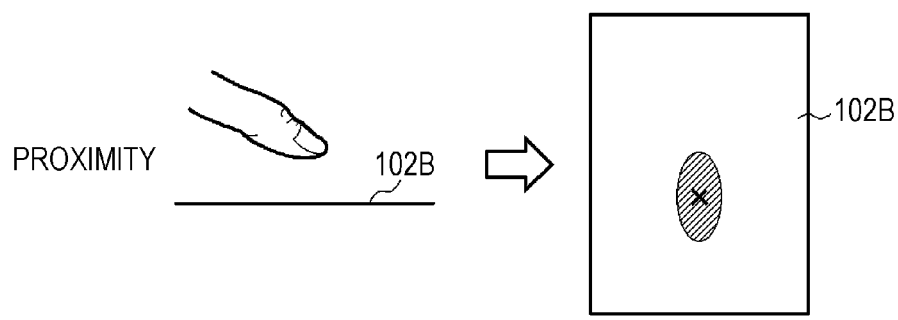

Specifically, as shown in FIGS. 5A and 5B, the CPU 110 recognizes a part in which the output value of the electrostatic sensor on the operation surface of the touch panel 102B is "50" or more, as the touch part. The CPU 110 recognizes a part in which the output value is "20" or more and less than "50", as the proximity part. The CPU 110 recognizes in a part in which the output value is less than "20", as the non-proximity part.

The CPU 110 can detect whether the operation surface is touched with a finger, is in proximity to a finger, or the like, by recognizing the touch part, the proximity part, and the non-proximity part on or to the operation surface of the touch panel 102B in the above way. Moreover, the CPU 110 can detect at which a position on the operation surface is touched with a finger or how close the operation surface at which position is to the proximity of a finger.

At this time, when there is a touch part, the CPU 110 is configured to detect, for example, the gravity center or the center of the touch part (the gravity center or the center of the side of a finger touching the operation surface) as a touch position. When there is only a proximity part, the CPU 110 is configured to detect, for example, the gravity center or the center of the proximity part (the gravity center or the center of the side of a finger which is in the proximity to the operation surface) as a proximity position.

Figure 6:
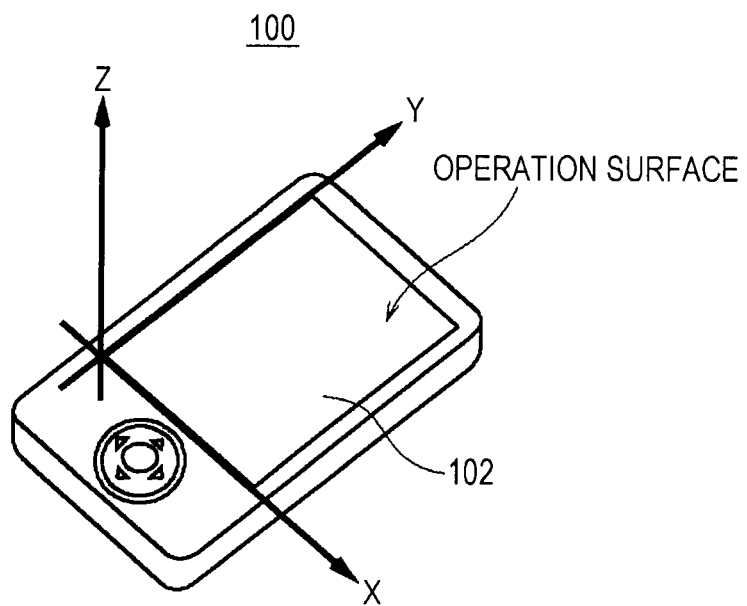
FIG. 6 is a schematic diagram illustrating description of a coordinate system of the touch position and the proximity position.

As shown in FIG. 6, the CPU 110 is configured to detect the touch position and the proximity position in the coordinates of an XYZ space in which, for example, a left lower corner of the operation surface is set to be the origin point on the assumption that the axis parallel to the short side of the operation surface of the touch panel 102B is the X axis, the axis parallel to the longer side thereof is the Y axis, and the axis vertical to the operation surface is the Z axis.

The CPU 110 detects shift in the touch position and the proximity position in the XYZ space by acquiring the output value of each electrostatic sensor from the touch panel 102B at an interval of a constant time and recognizing the touch part, the proximity part, and the non-proximity part.

The CPU 110 detects the movement of a finger on the touch panel 102B based on the shift and recognizes the touch operation and the proximity operation on and to the touch screen 102 based on the movement of the finger. The CPU 110 receives the touch operation or the proximity operation as an input operation and executes a process according to this input operation.

When recognizing an operation of pressing down the operation button 103, the CPU 110 receives this operation as an input operation and executes a process according to this input operation.

For example, suppose that when a reproduction button is displayed so that music data is reproduced on the touch screen 102, a user taps the reproduction button.

The CPU 110 receives this touch operation as an input operation of producing the music data, and then reads the music data from the non-volatile memory 111 and transmits the music data to a reproduction unit 113.

Under the control of the CPU 110, the reproduction unit 113 performs reproduction processes such as a decoding process, a digital-to-analog conversion process, and an amplification process on the music data to gain voice signals and outputs the voice signals from a headphone terminal (not shown).

In this manner, the user can listen to music through headphones connected to the headphone terminal.

At this time, the CPU 110 acquires information regarding a jacket image, a music title, an artist name, and the like in the read music data and displays the information on the liquid crystal panel 102A of the touch screen 102. Thus, the information regarding the music being reproduced can be presented to the user.

For example, suppose that when one image stored in the non-volatile memory 111 is displayed on the touch screen 102, the user flicks this image in a lower direction. The flicking is a touch operation of lightly flicking the operation surface.

The CPU 110 receives this touch operation as an input operation of display the subsequent image, reads image data corresponding to the subsequent image from the non-volatile memory 111, and displays an image on the liquid crystal panel 102A based on the image data.

In this manner, images stored in the non-volatile memory 111 are sequentially presented to the user.

For example, suppose that when a browser icon is displayed on the touch screen 102 to activate a web browser, the user taps this browser icon.

The CPU 110 receives the touch operation as an input operation of activating the web browser and activates the web browser.

Then, the CPU 110 displays a web browser screen on the liquid crystal panel 102A and simultaneously receives page data of web pages from a server on a network via a network interface 114. The CPU 110 displays a page image based on the page data on the web browser screen.

In this manner, the user can browse the web pages on the web browser screen.

For example, suppose that when a software keyboard is displayed on the touch screen 102, the user taps one of a plurality of keys of the software keyboard.

The CPU 110 receives this touch operation as an input operation of inputting characters corresponding to the tapped keys and displays the characters on the display panel 102A.

In this manner, the user can input characters through the software keyboard displayed on the touch screen 102.

A specific hardware example of the touch detection unit 2 and the proximity detection unit 3 of the information processing apparatus 1 described in the overview of this embodiment is the touch panel 102B of the above-described portable terminal 100. A specific hardware example of the control unit 4 of the information processing apparatus 1 is the CPU 110 of the portable terminal 100.

The portable terminal 100 is configured to predict the touch operation based on the movement of a finger in the proximity to the touch screen 102 and starts a process corresponding to the touch operation before the actual touch operation.

Hereinafter, prediction of the touch operation will be described in detail.

1-2-3. Prediction of Touch Operation

As described above, the CPU 110 detects the touch position and the proximity position on the operation surface as the coordinates of the XYZ space based on the output values and the positions of the respective electrostatic sensors obtained from the touch panel 102B at an interval of a constant time.

Hereinafter, a case will be described in which a tap which is one of the touch operations on the touch panel 102B is predicted based on the movement of a finger in the proximity to the touch panel 102B, that is, based on the shift in the proximity position.

Figure 7:
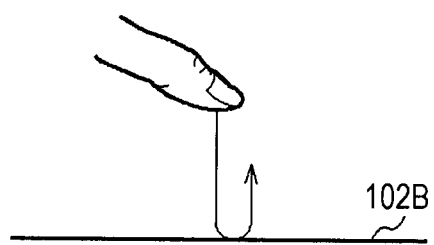
FIG. 7 is a schematic diagram illustrating movement of a finger when tapping is performed.

In effect, when tapping the operation surface of the touch panel 102B, as shown in FIG. 7, a user swiftly touches the operation surface with a finger nearly vertically and then detaches the finger from the operation surface.

Then, when detecting that the user swiftly presses down the operation surface with his finger nearly vertically, the portable terminal 100 recognizes that a preliminary process is performed when the user taps the operation surface and predicts that the user taps the operation surface.

Figure 8:
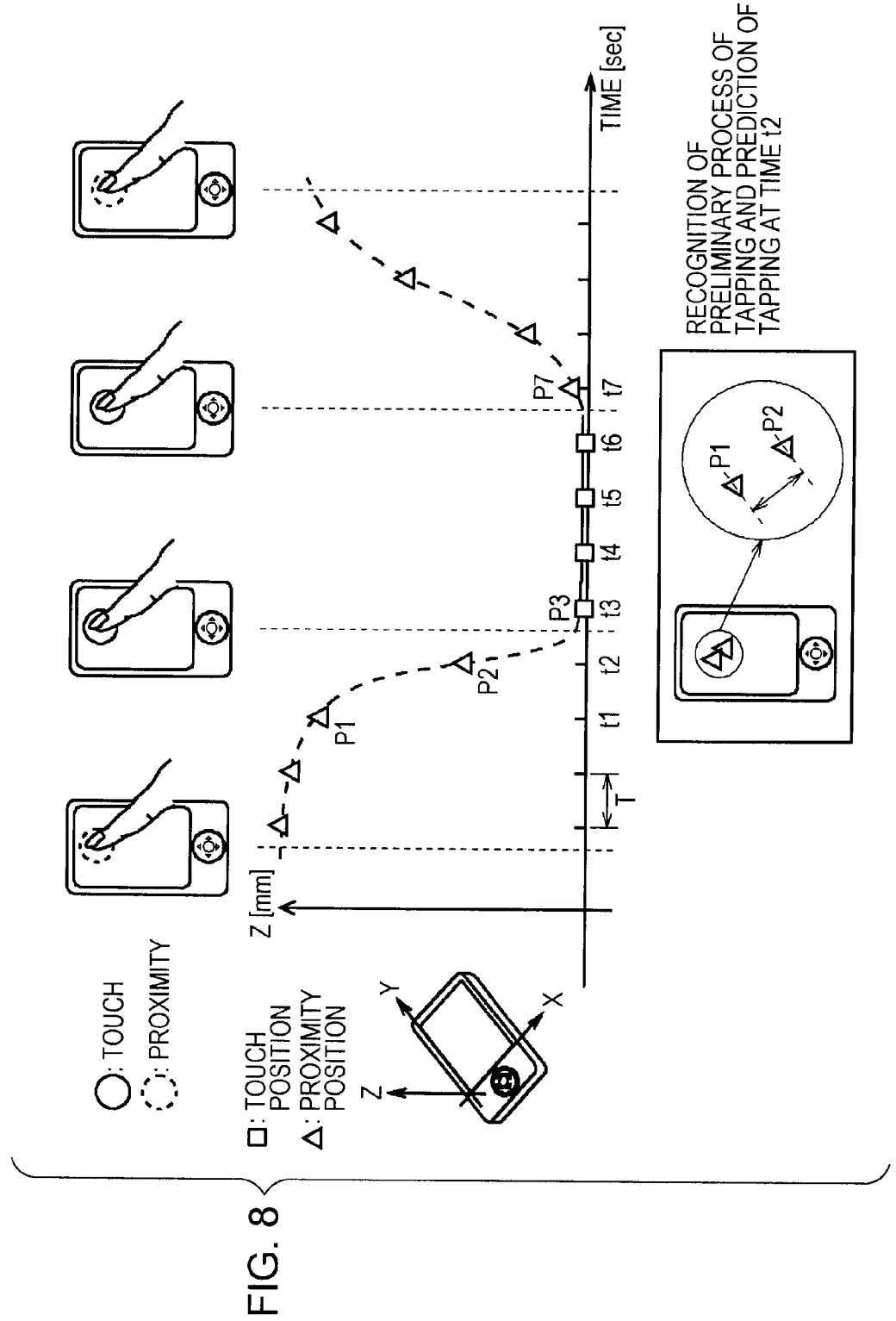
FIG. 8 is a schematic diagram illustrating description of prediction of tapping.

Specifically, as shown in FIG. 8, the CPU 110 detects the proximity position at an interval of a constant time T. Then, the CPU 110 calculates the variation amount of the Z coordinate based on the Z coordinate of the previous proximity position and the Z coordinate of the current proximity position. This variation amount indicates a variation amount of distance between the operation surface and the finger within the given time T.

The CPU 110 calculates the slope (that is, variation amount of Z coordinate/given time T) of the Z coordinate based on the variation amount of the Z coordinate. When the sign of the slope is "−", the slope indicates that the finger comes closer to the operation surface. When the sign of the slope is "+", the slope indicates that the finger becomes more distant from the operation surface. The absolute value of the slope indicates a speed when the finger comes closer or becomes more distant.

Thus, it can be understood how fast the finger approaches the operation surface at the slope of the Z coordinate and that the finger is detached from the operation surface.

Based on the X and Y coordinates of the previous proximity position and the X and Y coordinates of the current proximity position, the CPU 110 calculates a movement vector on the XY plane (that is, a plane parallel to the operation surface) at the proximity position within the constant time T. The movement vector indicates a movement amount and a movement direction of the finger on the operation surface within the given time T.

Based on the slope of the Z coordinate of the proximity position and the movement vector on the XY plane, which can be obtained in this way, within the constant time T, the CPU 110 determines whether the preliminary process upon tapping the operation surface is performed.

That is, the CPU 110 detects that the preliminary process upon the tapping is performed, when the slope of the Z coordinate at the proximity position within the given time T is "−" and the absolute value is a value equal to or greater than a predetermined value and the movement amount of the finger on the XY plane is equal to or less than a predetermined amount.

In other words, the CPU 110 determines that the preliminary process upon the tapping is performed, when the finger is approaching the operation surface at a speed equal to or faster than a given speed without being nearly moved in a direction parallel to the operation surface.

In effect, in the example of FIG. 8, it is assumed that the slope of the Z coordinate is "−" and the absolute value is equal to or greater than the predetermined value at time t2 at which a proximity position P2 is detected after the constant time T from time t1 at which a proximity position P1 is detected, and the movement amount on the XY plane is equal to or less than the predetermined amount.

Therefore, the CPU 110 determines that the preliminary process upon the tapping is performed at time t2 and predicts that the position corresponding to the X and Y coordinates of the proximity position P2 on the operation surface is tapped. Then, the CPU 110 starts a process corresponding to the tapping from the time t2.

For example, it is assumed here that the link of a web page is displayed at the position corresponding to the X and Y coordinates of the proximity position P2 on the operation surface.

In this case, the CPU 110 starts receiving page data of the web page of the link destination, when predicting that the link is tapped at time t2. Then, the CPU 110 stores the received page data in a RAM 112.

Thereafter, the CPU 110 recognizes that the operation surface of the touch panel 102B is actually touched, when detecting a touch position P3 at time t3 after the constant time T from time t2.

Moreover, the CPU 110 recognizes that the operation surface continues to be touched between time t4 to time t6, and then recognizes that the finger is detached from the operation surface, when detecting a proximity position P7 at time t7 after the constant time elapses from time t6.

The CPU 110 recognizes that the ink is actually tapped at time t7 at which the finger is detached from the operation surface. Then, the CPU 110 reads the page data stored in the RAM 112 up to time t7 and displays the web pages of the link destination based on the page data on the web browser screen.

Thus, the CPU 110 predicts that the link is tapped from the movement of the finger being approaching the operation surface at time t2 before the link is actually tapped, and starts receiving the page data of the link destination.

Thus, it is possible to shorten a period until the web page of the link destination is displayed from time t7 at which the link is actually tapped, compared to a case where the page data of the link destination start to be received at time t7 at which the link is actually tapped, as in the related art.

The CPU 110 is configured not to display the web pages of the link destination, for example, until the link is actually tapped, although the reception of the page data is completed before the link is actually tapped.

That is, the CPU 110 is configured to perform only a process (process of receiving the page data) which can be first executed in a background between processes (process of receiving the page data+process of displaying the web pages) corresponding to the tapping of the link.

Thus, it is possible to prevent the web pages of the link destination are displayed although the link is not tapped due to the incorrectness of the prediction. Therefore, no disadvantage occurs for the user.

Like the reception of the page data, a process which is initially performed in the background so that a user may not directly recognize the process is called a BG (background) process. Like the display of the web page, a process which is performed in the foreground so that a user can directly recognize the process is called an FG (foreground) process.

The CPU 110 stops receiving the page data due to incorrectness of the prediction, for example, when the link is not actually tapped although the predetermined time has elapsed from time t2 at which the tapping of the link is predicted.

Thus, it is possible to prevent a situation where the process corresponding to the predicted tapping is unnecessarily continued, irrespective of the incorrectness of the prediction.

Next, a case will be described in which flicking, which is one of the touch operations on the touch panel 102B by the movement of a finger in the proximity to the touch panel 102B, that is, based on the shift in the proximity position, is predicted.

Figure 9:
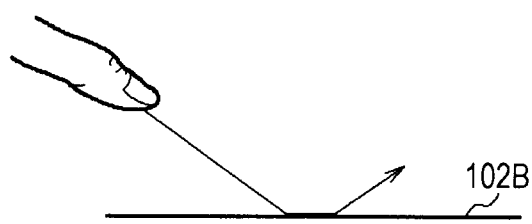
FIG. 9 is a schematic diagram illustrating the movement of a finger when flicking is performed.

In effect, when flicking the operation surface of the touch panel 102B, as shown in FIG. 9, a user swiftly performs the process of touching the operation surface so as to move downward in an inclined manner with the finger, sliding the finger on the operation surface, and then detaching the finger from the operation surface.

Then, when detecting that the user swiftly moves his finger downward in the inclined manner on the operation surface, the portable terminal 100 recognizes that the user performs the preliminary process upon the flicking on the operation surface and predicts that the user flicks the operation surface.

Figure 10:
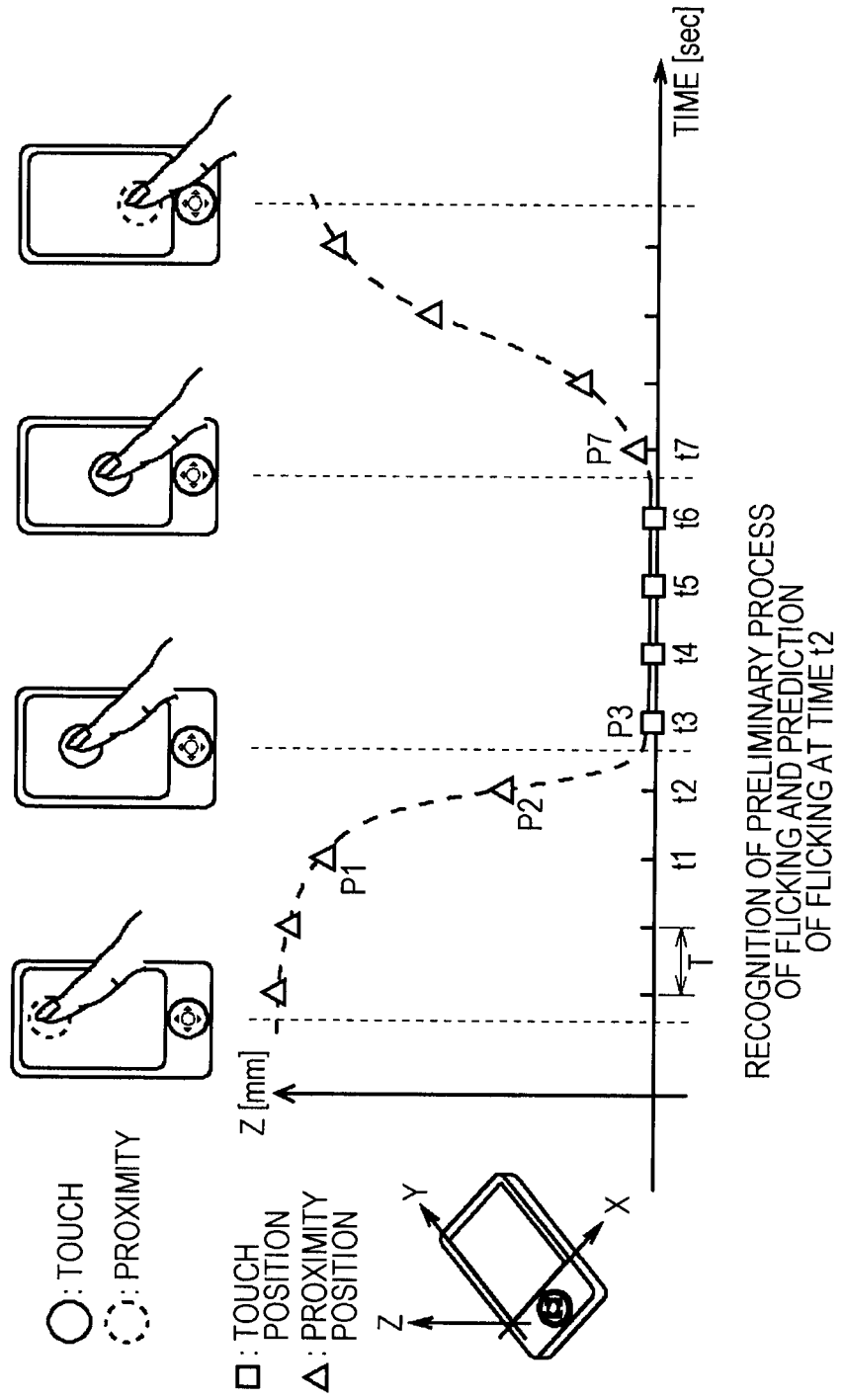
FIG. 10 is a schematic diagram for describing prediction (1) of the flicking.
Figure 11:
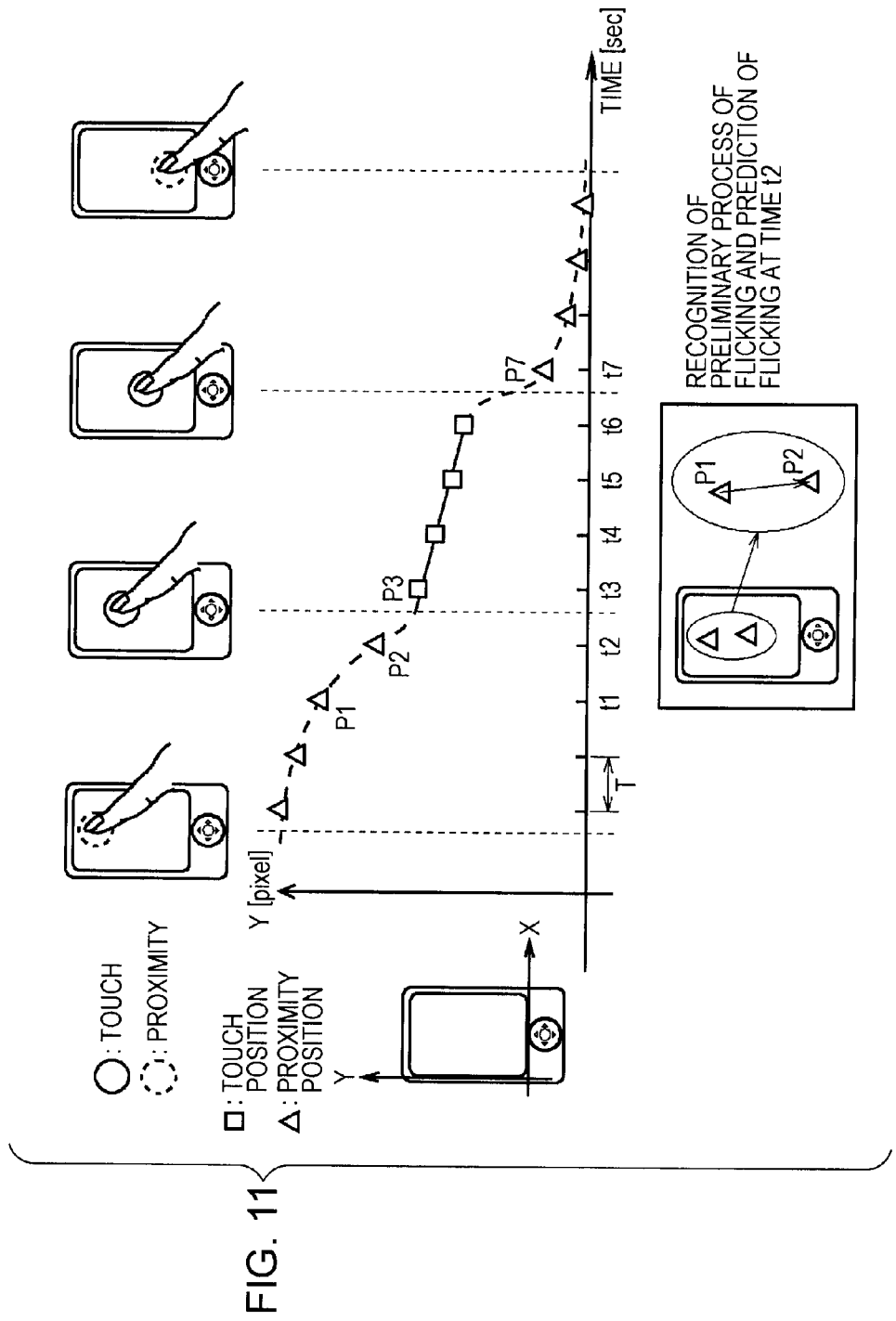
FIG. 11 is a schematic diagram for describing prediction (2) of the flicking.

Specifically, as shown in FIGS. 10 and 11, the CPU 110 detects the proximity position at an interval of a constant time T, as in the prediction of the tapping. At this time, the CPU 110 calculates the variation amount of the Z coordinate based on the Z coordinate of the previous proximity position and the Z coordinate of the current proximity position.

The CPU 110 calculates the slope (that is, variation amount of Z coordinate/given time T) of the Z coordinate based on the variation amount of the Z coordinate. It can be understood how fast the finger approaches the operation surface and that the finger is detached from the operation surface from the slope of the Z coordinate.

Based on the X and Y coordinates of the current proximity position and the X and Y coordinates of the previous proximity position, the CPU 110 calculates the movement vector of the proximity position on the XY plane (that is, the surface parallel to the operation surface) within the constant time T. The movement vector indicates a movement amount and a movement direction of the finger on the operation surface within the given time T.

Based on the slop of the Z coordinate of the proximity position and the movement vector on the XY plane within the constant time T obtainable in this way, the CPU 110 determines whether the preliminary process upon the flicking on the operation surface is performed.

That is, the CPU 110 detects that the preliminary process upon the flicking on the operation surface is performed, when the slope of the Z coordinate at the proximity position within the given time T is "−" and the absolute value is a value equal to or greater than a predetermined value and the movement amount of the finger on the XY plane is equal to or greater than a predetermined amount.

In other words, the CPU 110 determines that the preliminary process upon the flicking on the operation surface is performed, when the finger is approaching the operation surface at a speed equal to or faster than a given speed while being moved in a direction parallel to the operation surface.

In effect, in the example of FIGS. 10 and 11, it is assumed that the slope of the Z coordinate is "−" and the absolute value is equal to or greater than the predetermined value at time t2 at which a proximity position P2 is detected after the constant time T from time t1 at which a proximity position P1 is detected, and the movement amount on the XY plane is equal to or greater than the predetermined amount.

Therefore, time t2, the CPU 110 determines that the preliminary process upon the flicking is performed and predicts that the operation surface is flicked in a direction indicated by the movement vector. Then, the CPU 110 starts a process corresponding to the flicking from time t2.

For example, suppose that an arbitrary image is displayed on the liquid crystal panel 102A. In this case, the CPU 110 starts reading the image data as the BG processing when predicting that the operation surface is flicked at time t2 in the direction indicated by the movement vector.

Then, the CPU 110 starts reading the image data corresponding to the previous image of the image being displayed, for example, when predicting the flicking in an upward direction of the operation surface. Alternatively, the CPU 110 starts reading the image data corresponding to the subsequent image of the image being displayed, for example, when predicting the flicking in a downward direction of the operation surface. Then, the CPU 110 sequentially stores the read image data in the RAM 112.

Thereafter, the CPU 110 recognizes that the operation surface of the touch panel 102B is actually touched by detecting the touch position P3 at time t3 after the constant time elapses from time t2.

Moreover, the CPU 110 recognizes that the touch position is continuously touched while being moved between time t4 to time t6, and then recognizes that the finger is detached from the operation surface by detecting the proximity position P7 at time t7 after the constant time elapses from time t6.

The CPU 110 recognizes that the operation surface is actually flicked in an arbitrary direction at time t7 at which the finger is detached from the operation surface. Then, the CPU 110 reads the image data stored in the RAM 112 up to time t7 and displays the images based on the image data on the liquid crystal panel 102A as the FG processing.

In this manner, the CPU 110 predicts that the operation surface is flicked in an arbitrary direction from the movement of the finger approaching the operation surface at time t2 before the operation surface is actually flicked in the arbitrary direction. In addition, the CPU 110 starts reading the image data.

Thus, it is possible to shorten a period until the previous or subsequent image is displayed from time t7 at which the operation surface is actually flicked, compared to a case where the image data starts to be read at time t7 at which the operation surface is actually flicked, as in the related art.

The CPU 110 is configured not to display the image until the operation surface is actually flicked, for example, although the reading of the image data is completed before the operation surface is actually flicked.

That is, the CPU 110 is configured to perform only a BG process (process of reading the image data) which can be first executed in a background between processes (process of reading the image data+process of displaying the image) corresponding to the flicking.

Thus, it is possible to prevent a situation where the subsequent image is displayed by performing the FG processing although the operation surface is not flicked due to the incorrectness of the prediction. Therefore, no disadvantage occurs for the user.

The CPU 110 stops reading the image data due to incorrectness of the prediction, for example, when the operation surface is not actually flicked although the predetermined time has elapsed from time t2 at which the flicking is predicted.

Thus, it is possible to prevent a situation where the process corresponding to the predicted flicking is unnecessarily continued, irrespective of the incorrectness of the prediction.

As described above, the portable terminal 100 predicts the tapping or the flicking before the user performs the tapping or the flicking and starts the corresponding process based on how fast the finger approaching the touch screen 102 is moved and in which direction.

Thus, it is possible to shorten the period until the tapping or flicking is actually performed and then the corresponding process ends, compared to a case where the tapping or the flicking is actually performed and then the corresponding process starts, as in the related art.

1-2-4. Operation Prediction Processing Order

Figure 12:
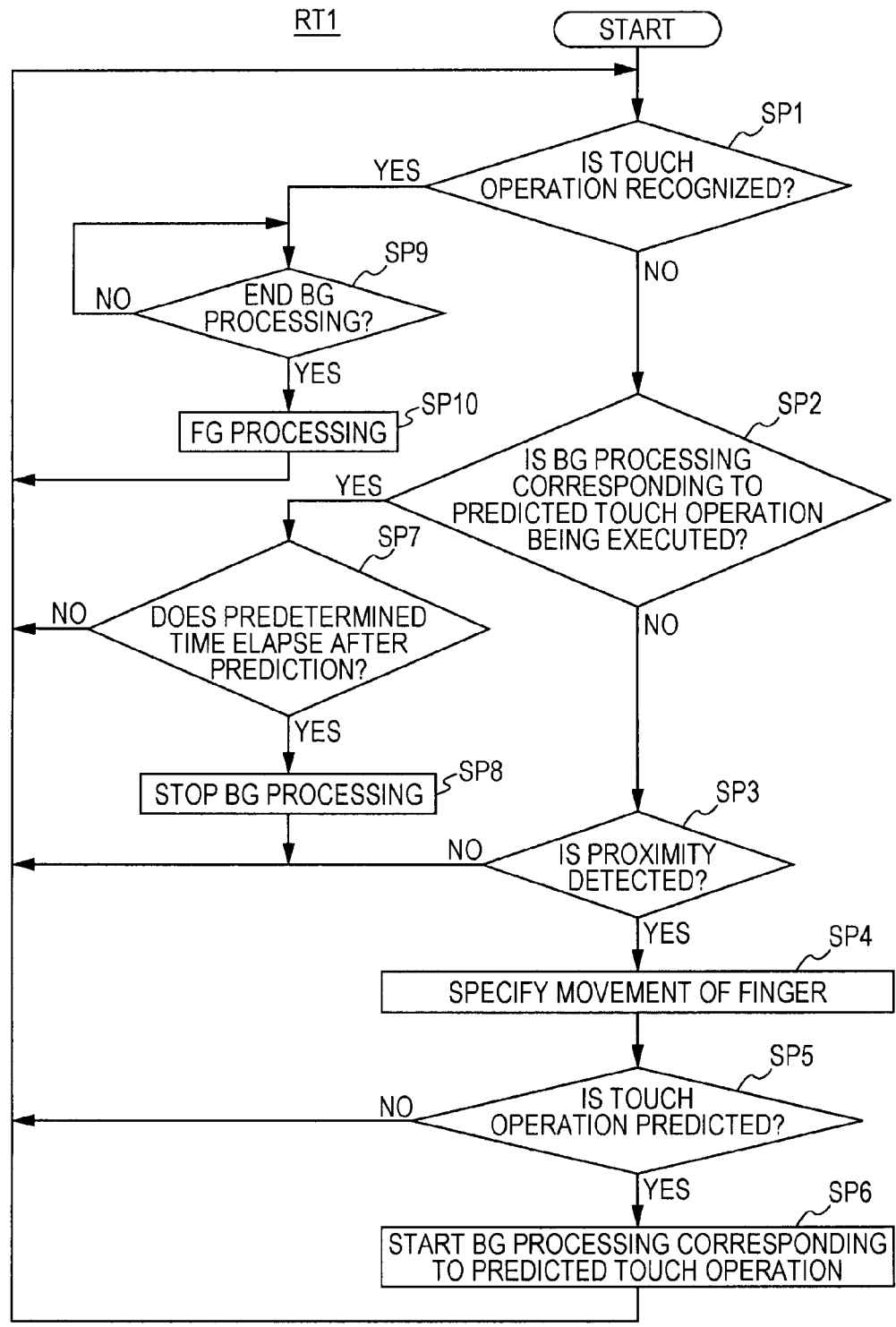
FIG. 12 is a flowchart illustrating operation prediction processing order according to a first embodiment.

Next, a specific processing order (which is referred to as operation prediction processing order) when the touch operation such as tapping or flicking is predicted by the portable terminal 100 will be described with the flowchart of FIG. 12. Operation prediction processing order RT1 shown in FIG. 12 is processing order executed according to a program stored in the non-volatile memory 111 by the CPU 110 of the portable terminal 100.

When the portable terminal 100 is turned on, the CPU 110 starts the operation prediction processing order RT1 and allows the process to proceed to step SP1. In step SP1, the CPU 110 determines whether the touch operation on the touch panel 102B is actually performed.

Then, when the touch operation on the touch panel 102B is not actually performed and thus a negative result is obtained in step SP1, the CPU 110 allows the process to proceed to step SP2.

In step SP2, the CPU 110 determines whether to currently execute the BG processing corresponding to the predicted touch operation.

When the BG processing corresponding to the predicted touch operation is not performed and thus the negative result is obtained in step SP2, the CPU 110 allows the process to proceed to step SP3.

In step SP3, the CPU 110 determines whether the proximity of the finger to the touch panel 102B is detected.

When the positive result is obtained in step SP3 by detection of the proximity of the finger, the CPU 110 allows the process to proceed to step SP4.

In step SP4, the CPU 110 specifies the movement of the finger in the proximity to the operation surface of the touch panel 102B based on the current proximity position and the previous proximity position, and allows the process to proceed to step SP5 subsequent to SP4.

In step SP5, the CPU 110 determines whether the touch operation can be predicted from the movement of the finger in the proximity to the operation surface specified in step SP5.

For example, it is determined that the tapping can be predicted in that the movement of the finger specified in step SP5 is movement of the finger which is nearly vertically approaching the operation surface. Then, the CPU 110 obtains the positive result of step SP5 and allows the process to proceed to step SP6.

In step SP6, the CPU 110 starts the BG processing corresponding to the predicted touch operation, and then the process again returns to step SP1.

On the other hand, when the BG processing corresponding to the predicted touch operation is performed and the positive result is obtained in step SP2 described above, the CPU 110 allows the process to proceed to step SP7.

In step SP7, the CPU 110 predicts the touch operation and then determines whether a predetermined time elapses.

When the predetermined time does not elapse and thus the negative result is obtained in step SP7, the CPU 110 allows the process to return to step SP1.

Alternatively, when the predetermined time elapses and thus the positive result is obtained in step SP7, the CPU 110 allows the process to proceed to step SP8.

In step SP8, the CPU 110 stops the BG processing corresponding to the predicted touch operation since the touch operation is not actually performed even the predetermined time elapses after the prediction of the touch operation. Then, the process returns to step SP1.

On the other hand, when the touch operation on the touch panel 102B is actually performed and thus the positive result is obtained in step SP1 described above, the CPU 110 allows the process to proceed to step SP9.

In step SP9, the CPU 110 awaits the ending of the BG processing corresponding to the touch operation. Then, when the BG processing ends and thus the positive result is obtained in step SP9, the CPU 110 allows the process to proceed to step SP10.

In step SP10, the CPU 110 performs the FG processing continued after the BG processing, and then the process returns to step SP1.

When the proximity of the finger is not detected and thus the negative result is obtained in step SP3 described above and when the touch operation is not predicted and thus the negative result is obtained in step SP5 described above, the CPU 110 also allows the process to return to step SP1.

According to the operation prediction processing order RT1, the CPU 110 of the portable terminal 100 predicts the touch operation and starts the corresponding to BG processing before the touch operation is actually performed.

1-2-5. Process and Advantage

With such a configuration described above, the CPU 110 of the portable terminal 100 detects the position of the finger which approaches or touches the touch panel 102B from the output value of the touch panel 102B at an interval of the constant time T.

Moreover, the CPU 110 detects the movement of the finger approaching the touch panel 102B based on the shift in the approached position (proximity position).

When this movement is the immediately previous movement (preliminary process) of the touch operation, the CPU 110 predicts that the touch operation is performed and starts the process corresponding to the touch operation before the touch operation is actually performed.

Thus, in the portable terminal 100, it is possible to shorten the period until the touch operation is actually performed and then the corresponding process ends, compared to a case where the process corresponding to the touch operation starts after the touch operation is actually performed.

The CPU 110 starts only the BG processing which can be first performed in the background among the process corresponding to the touch operation so that the user does not directly recognize the BG processing, and performs the FG processing directly recognized by the user after the touch operation is actually performed.

In effect, the user initially recognizes that the process corresponding to the touch operation is performed when the FG processing is performed. Therefore, when the FG processing is performed at the prediction time of the touch operation, an unintended process of the user may be performed in a case where the prediction is incorrect.

Therefore, the CPU 110 can prevent the unintended process of the user from being performed when the prediction is incorrect, by performing the FG processing after the touch operation is actually performed.

When the predetermined time elapses from the prediction time of the touch operation but the touch operation is not actually performed, the CPU 110 of the portable terminal 100 considers that the prediction is incorrect and thus stops the BG processing.

Thus, in the portable terminal 100, it is possible to have a situation where the BG processing corresponding to the predicted touch operation is unnecessarily continued, irrespective of the incorrectness of the prediction.

With such a configuration, the portable terminal 100 predicts the touch operation on the touch panel 102B based on the movement of a finger approaching the touch panel 102B, and starts the process corresponding to the touch operation before the touch operation is actually performed. Thus, it is possible to shorten the period from when a user actually performs the touch operation to when the process corresponding to the touch operation ends, thereby further improving the responsiveness to the touch operation compared to the related art.

2. Second Embodiment

Next, a second embodiment will be described. In the second embodiment, a touch operation on keys is predicted when a software keyboard is displayed on the touch screen 102.

The outer configuration and the hardware configuration of the portable terminal 100 are the same as those of the first embodiment and thus will be described with reference to the first embodiment. Hereinafter, only the prediction of a touch operation when the software keyboard is displayed will be described.

2-1. Prediction of Touch Operation

Figure 13:
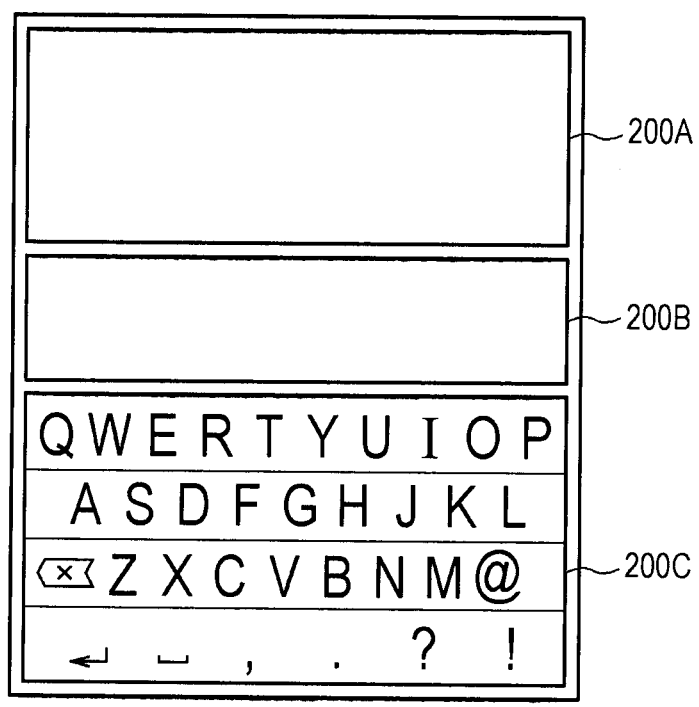
FIG. 13 is a schematic diagram illustrating the structure of a character input screen according to a second embodiment.

The CPU 110 of the portable terminal 100 displays a character input screen 200 shown in FIG. 13 as a screen used to input characters on the liquid crystal panel 102A.

The character input screen 200 includes a character display area 200A where input characters are displayed, a conversion candidate display area 200B where character conversion candidates are displayed, and a key display area 200C where a software key board is displayed.

On the key display area 200C, a plurality of keys arranged in a QWERTY form is displayed as a software keyboard.

When one of the keys displayed in the key display area 200C is touched on the character input screen 200, the character corresponding to this key is displayed in the character display area 200A.

When a key is touched on the character input screen 200, the conversion candidates including the character corresponding to the key are displayed in the conversion candidate display area 200B.

When one of the conversion candidates displayed on the conversion candidate display area 200B is tapped before the input of the character displayed in the character display area 200A is confirmed, this conversion candidate is displayed in the character display area 200A.

When the character input screen 200 is displayed on the liquid crystal panel 102A, the CPU 110 predicts the touch of a key based on the movement of a finger approaching the touch panel 102B.

In effect, when inputting a sentence, a user repeats a process of swiftly moving the finger onto a desired key on the operation surface of the touch panel 102B, touching the key in a downward motion with the finger, and detaching the finger from the key.

When the movement speed of the finger in a direction parallel to the operation surface is slowed and the finger approaches the operation surface, the portable terminal 100 recognizes that a preliminary process upon touching the key is performed, and thus predicts that the user touches the key.

Figure 14:
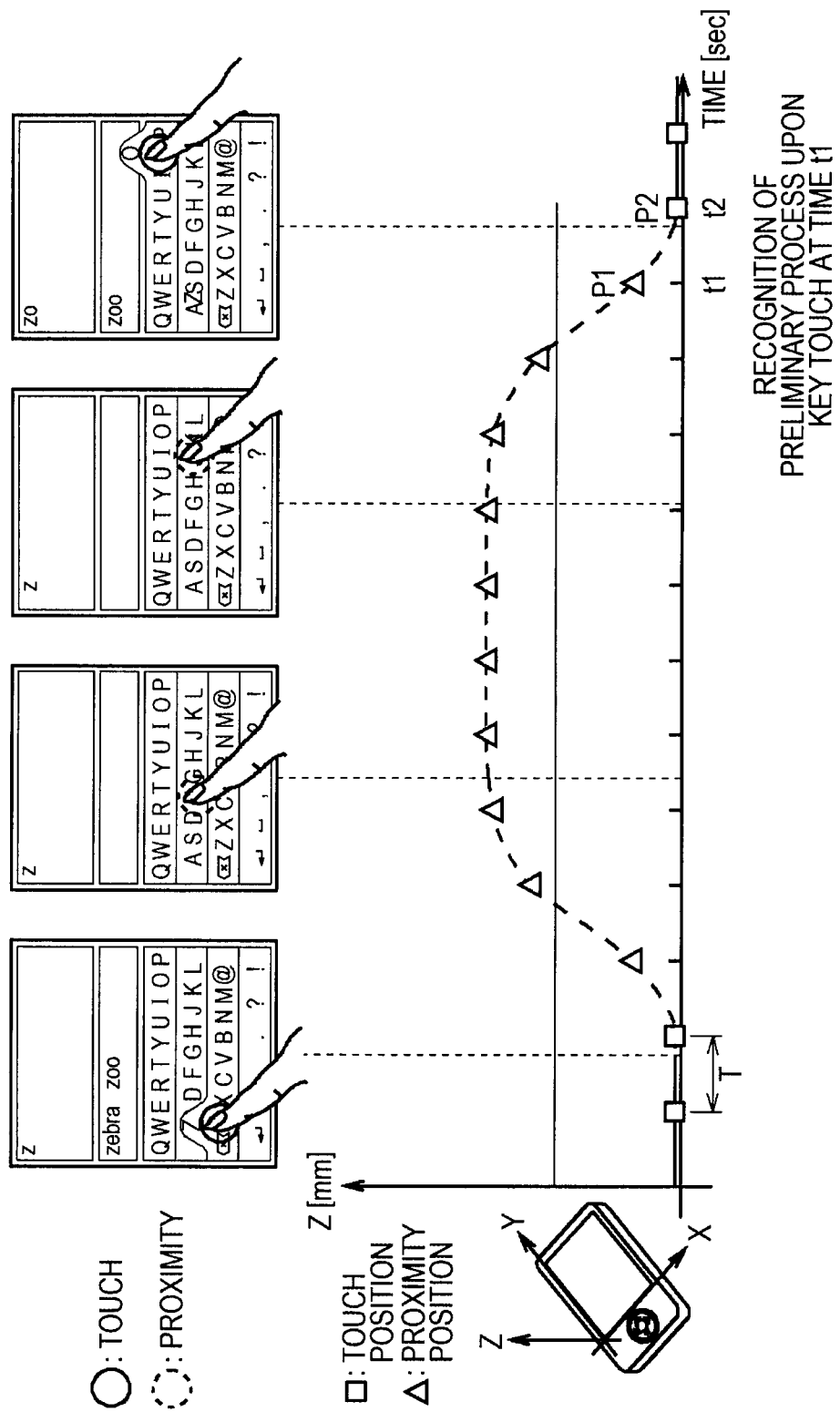
FIG. 14 is a schematic diagram for describing prediction (1) of key touch.
Figure 15:
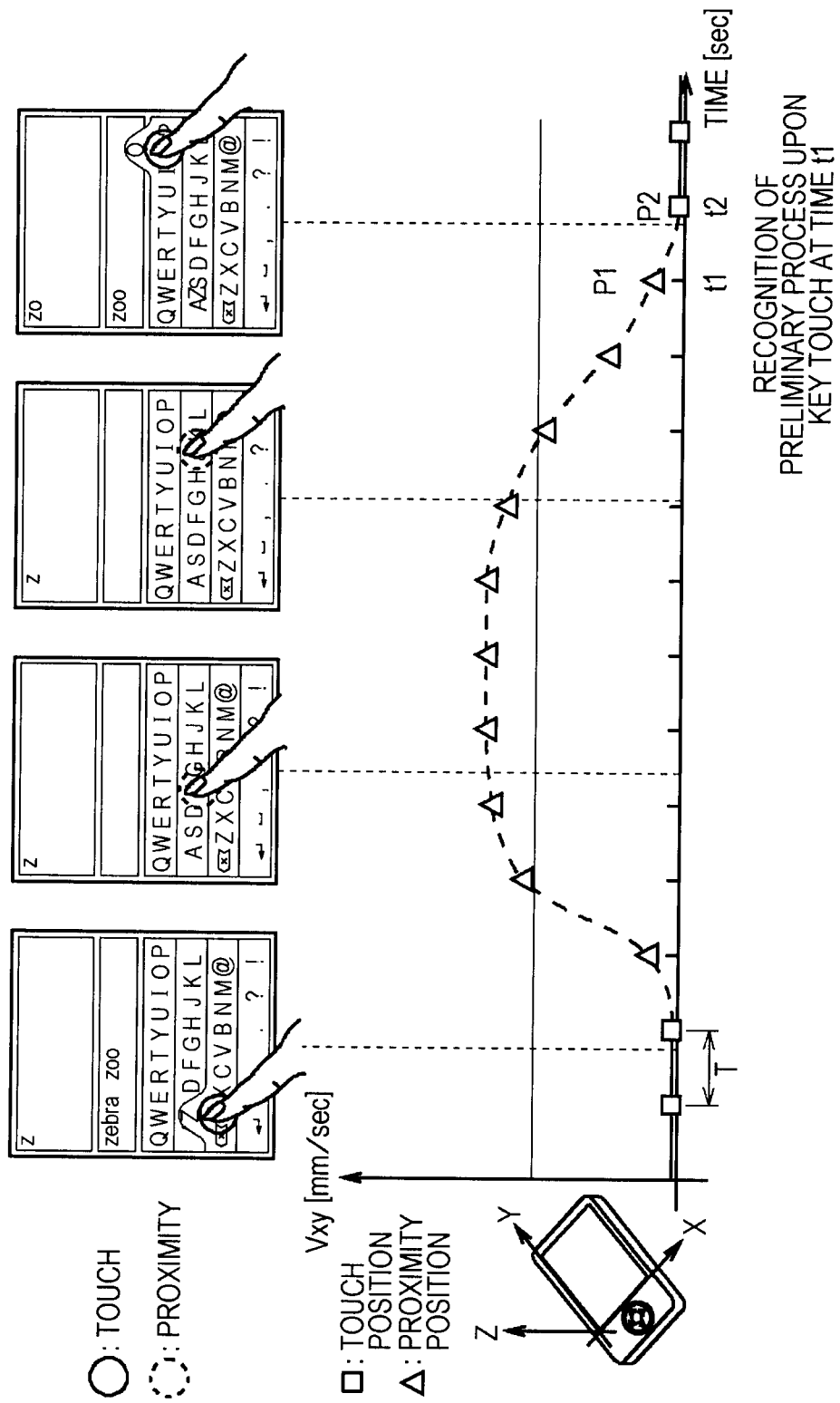
FIG. 15 is a schematic diagram for describing prediction (2) of key touch.

Specifically, the CPU 110 detects the proximity position at the interval of the constant time T, as shown in FIGS. 14 and 15. Then, the CPU 110 obtains the Z coordinate of this proximity position. The Z coordinate indicates the distance between the operation surface and the finger.

The CPU 110 calculates the movement vector of the proximity position on the XY plane within the constant time T based on the X and Y coordinates of the previous proximity position and the X and Y coordinates of the current proximity position. The movement vector indicates the movement amount (that is, a movement speed Vxy) and the movement direction of the finger on the operation surface within the constant time T. That is, from the movement vector, it can be understood how fast the finger is currently moved in which direction on the operation surface.

Based on the Z coordinate of the proximity position and the movement vector of the proximity position on the XY plane obtainable in this way, the CPU 110 determines whether the preliminary process upon touching the key on the operation surface is performed.

That is, the CPU 110 determines that the preliminary process upon touching the key is performed, when the Z coordinate of the proximity position is equal to or less than a predetermined value and the movement speed Vxy of the finger in the direction parallel to the operation surface is equal to or less than a predetermined value.

In other words, the CPU 110 determines that the preliminary process upon touching the key is performed, when the finger approaches the operation surface while the movement speed in the direction parallel to the operation surface is slowed.

In effect, in the examples of FIGS. 14 and 15, the time at which the proximity position P1 is detected is time t1, the Z coordinate is equal to or less than the predetermined value, and the movement speed Vxy of the finger in the direction parallel to the operation surface is equal to or less than the predetermined value.

Therefore, the CPU 110 determines that the preliminary process upon touching the key on the operation surface is performed at time t1 and predicts that the key is touched at the position corresponding to the X and Y coordinates of the proximity position P1. Then, the CPU 110 starts the process corresponding to the touching of the key from time t1.

Specifically, the CPU 110 starts a process of focusing on the key predicted to be touched and a process of searching the conversion candidates including the character corresponding to the key from dictionary data stored in the non-volatile memory 111. Then, the CPU 110 sequentially stores the conversion candidates obtained through the search in the RAM 112.

The process of focusing on the key refers to a process of moving, expanding, and displaying the key in a predetermined direction (for example, upward direction) to the extent that the key is not covered with the finger touching the key.

Thereafter, the CPU 110 recognizes that the key is actually touched by detecting the touch position P2 at time t2 after a given time elapses from time t1.

Then, the CPU 110 displays the character corresponding to the touched key on the character display area 200A, and simultaneously reads the conversion candidates stored in the RAM 112 and displays the read conversion candidates in the conversion candidate display area 200B.

In this manner, the CPU 110 predicts that key is touched from the movement of the finger approaching the operation surface at time t1 before the key is actually touched, and starts the process of focusing on the key and the process of searching the conversion candidates of the character corresponding to the key.

Thus, it is possible to shorten the period until the process ends from time t2 at which the key is actually touched, compared to a case where the process starts at time t2 at which the key is actually touched, as in the related art.

Moreover, the CPU 110 does not focus on a key, as long as the movement speed Vxy of the finger in the direction parallel to the operation surface exceeds the predetermined value even when the Z coordinate of the proximity position is equal to or less than the predetermined value.

That is, when the finger approaches the operation surface but the finger is swiftly moved in the direction parallel to the operation surface, it is configured that the key is not focused although the finger just passes above the key.

Thus, it is possible to prevent all the keys present along the movement path from being focused, for example, when a user touches a given key with a finger, detaches the finger from the key, and moves the finger up to the key to be subsequently touched.

However, in some cases, the Z coordinate of the proximity position exceeds the predetermined value and the movement speed Vxy of the finger in the direction parallel to the operation surface is equal to or less than the predetermined value, that is, the movement speed in the direction parallel to the operation surface is slowed but the finger is distant from the operation surface to some extent. In this case, it is not concluded that the preliminary process upon touching key is performed, but it is considered that there is a possibility that the key is touched.

At this time, the CPU 110 starts only the process (that is, the BG processing) of searching the conversion candidates including the character corresponding to the key at the position corresponding to the X and Y coordinates of the proximity position from the dictionary data. The CPU 110 does not perform the focusing process (that is, FG processing).

Thus, it is possible to prevent a situation where the key is focused although the key is not touched due to the incorrectness of the prediction. Therefore, no disadvantage occurs for a user.

As described above, the portable terminal 100 predicts that the user touches a key and starts the corresponding process before the user touches the key, based on how fast the finger approaching the touch screen 102 is moved and how distant the finger is from the touch screen 102.

Thus, as in the related art, it is possible to shorten the period until the process corresponding to the touch operation ends after the key is actually touched, compared to a case where the key is actually touched and then the corresponding process starts.

2-2. Operation Prediction Processing Order

Figure 16:
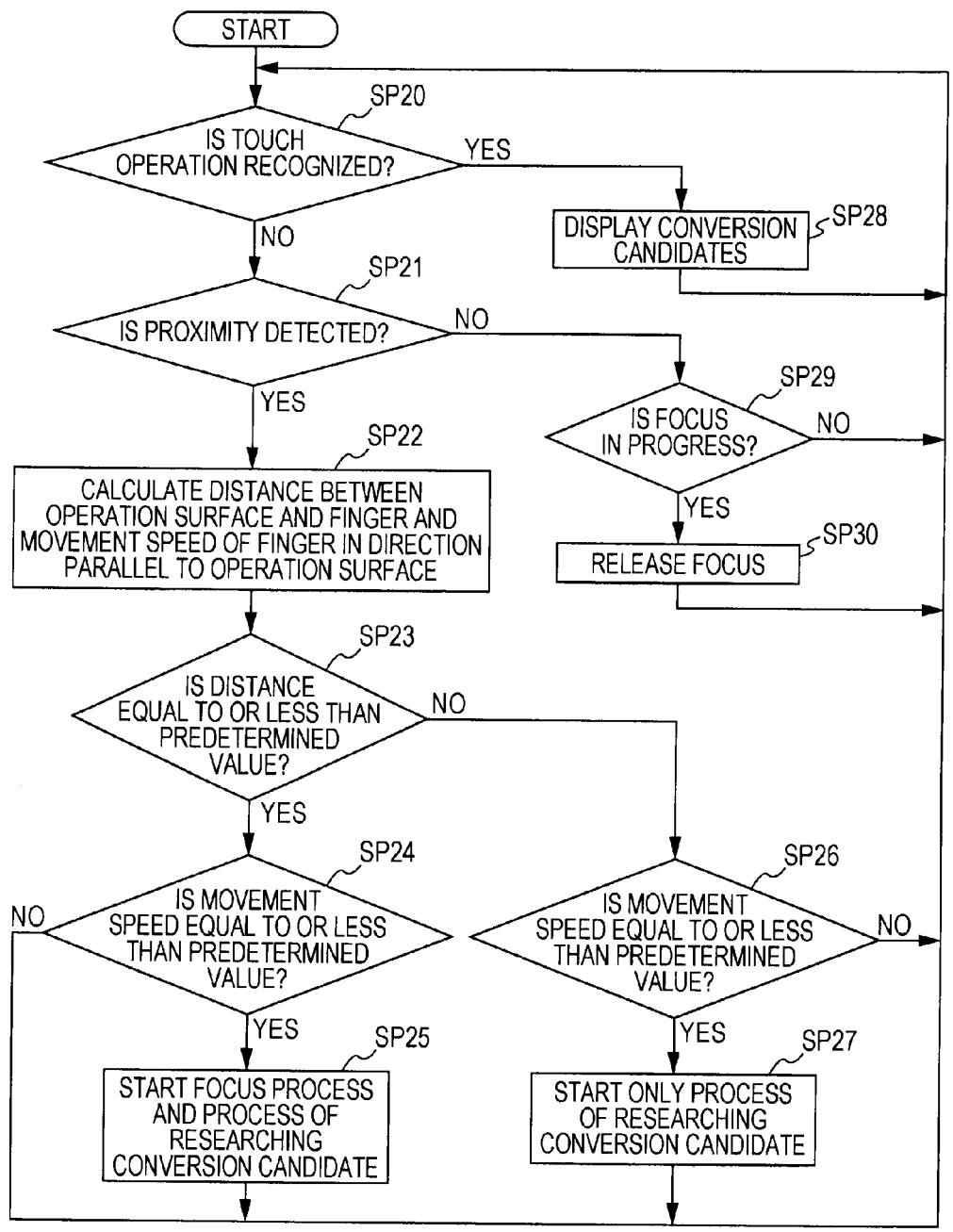
FIG. 16 is a flowchart illustrating operation prediction processing order according to a second embodiment.

Next, a specific operation prediction processing order when the portable terminal 100 predicts a touch operation on a key will be described with reference to the flowchart illustrated in FIG. 16. The operation prediction processing order RT2 shown in FIG. 16 is order in which the CPU 110 of the portable terminal 100 executes processing according to a program stored in the non-volatile memory 111.

For example, the CPU 110 starts the operation prediction processing order RT2 when the portable terminal 100 is turned on, and allows the process to proceed to step SP20. In step SP20, the CPU 110 determines whether the touch operation on the touch panel 102B is actually performed.

When the touch operation on the touch panel 102B is not actually performed and thus the negative result is obtained in step SP20, the CPU 110 allows the process to proceed to step SP21.

In step SP21, the CPU 110 determines whether the proximity of the finger to the touch panel 102B is detected.

When the proximity of the finger is detected and thus the positive result is obtained in step SP21, the CPU 110 allows the process to proceed to step SP22.

In step SP22, the CPU 110 obtains the distance (Z coordinate) between the operation surface of the touch panel 102B and the finger and the movement speed Vxy of the finger in the direction parallel to the operation surface based on the current proximity position and the previous proximity position, and then allows the process to proceed to step SP23 subsequent to step SP22.

In step SP23, the CPU 110 determines whether the distance between the operation surface and the finger is equal to or less than the predetermined value.

When the distance between the operation surface and the finger is equal to or less than the predetermined value and thus the positive result is obtained in step SP23, the CPU 110 allows the process to proceed to step SP24.

In step SP24, the CPU 110 determines whether the movement speed Vxy of the finger in the direction parallel to the operation surface is equal to or less than the predetermined value.

When the movement speed Vxy of the finger in the direction parallel to the operation surface is equal to or less than the predetermined value and thus the positive result is obtained in step SP24, it means that the preliminary process of the touching of the key is performed. Then, the CPU 110 allows the process to proceed to step SP25.

In step SP25, the CPU 110 predicts that the key at the position corresponding to the X and Y coordinates of the current proximity position is tapped and starts the process of focusing on the tapped key and the process of searching the conversion candidates including the character corresponding to the tapped key from the dictionary data. Then, the CPU 110 allows the process to return to step SP20.

When the distance between the operation surface and the finger exceeds the predetermined value and thus the negative result is obtained in step SP23 described above, the CPU 110 allows the process to proceed to step SP26.

In step SP26, the CPU 110 determines whether the movement speed Vxy of the finger in the direction parallel to the operation surface is equal to or less than the predetermined value.

When the movement speed Vxy of the finger in the direction parallel to the operation surface is equal to or less than the predetermined value and thus the positive result is obtained in step SP26, it means that the key is likely to be touched. Then, the CPU 110 allows the process to proceed to step SP27.

In step SP27, the CPU 110 starts only the process of searching the conversion candidates including the character corresponding to the key from the dictionary data from the fact that the key at the position corresponding to the X and Y coordinates of the current proximity position is likely to be touched. Then, the CPU 110 allows the process to return to step SP20.

When the negative result is obtained in step SP24 and step SP25 described above, the CPU 110 does not perform any process as the key is not likely to be touched and the process returns to step SP20.

On the other hand, when the touch operation on the touch panel 102B is actually performed and thus the positive result is obtained in step SP20 described above, the CPU 110 allows the process to proceed to step SP28.

In step SP28, the CPU 110 reads conversion characters including the character corresponding to the touched key from the RAM 112 and displays the conversion characters in the conversion character display area 200B. Then, the process returns to step SP20. At this time, when the process of searching the conversion characters including the character corresponding to the touched key does not end, this process ends and the conversion candidates obtained through the search are displayed.

On the other hand, when the proximity of the finger is not detected and thus the negative result is obtained in step SP21 described above, the CPU 110 allows the process to proceed to step SP29.

In step SP29, the CPU 110 determines whether the key is focused at this time.

When the key is focused and thus the positive result is obtained, the finger touching the key until just before is meant to get distant from the operation surface. Then, the CPU 110 allows the process to proceed to step SP30.

In step SP30, the CPU 110 releases the focusing, and then the process returns to step SP20. When the negative result is obtained in step SP29 described above, the CPU 110 allows the process to return to step SP20.

According to the operation prediction processing order RT2, the CPU 110 of the portable terminal 100 predicts that the key is touched and starts the process of searching the process of focusing on a key and the process of searching the conversion candidates before the key is actually touched.

2-3. Process and Advantage

With such a configuration, the CPU 110 of the portable terminal 100 the distance between the operation surface of the touch panel 102B and the finger and the movement speed Vxy of the finger in the direction parallel to the operation surface from the position (proximity position) of the finger approaching the touch panel 102B and the shift in the position of the finger.

The CPU 110 predicts the key is touched, when the distance is equal to or less than the predetermined value and the movement speed Vxy is equal to or less than the predetermined value, that is, the finger becomes closer to the operation surface while the movement speed in the direction parallel to the operations surface is reduced.

The CPU 110 starts the process of focusing on the key and the process of searching the conversion candidates including the character corresponding to the key before the key is actually touched.

Then, in the portable terminal 100, it is possible to shorten the period until the key is actually touched and then the process ends, compared to a case where the key is actually touched and then the process starts.

The CPU 110 does not focus on the key, as long as the movement speed Vxy of the finger in the direction parallel to the operation surface exceeds the predetermined value even when the distance between the operation surface and the finger is equal to or less than the predetermined value.

Thus, it is possible to prevent all the keys present along the movement path from being focused, for example, when a user touches a given key with a finger, and the user detaches the finger from the key, and the user moves the finger up to the key to be subsequently touched. That is, only the key which the user intends to touch can be focused. Thus, it is possible to reduce processing disallowance when characters are input and to improve operability.

With such a configuration, in the portable terminal 100, it is possible to shorten the period from when the user actually touches a key to when the process corresponding to the touching ends. Therefore, the responsiveness to the touch operation can be further improved, compared to the related art.

3. Third Embodiment

Next, a third embodiment will be described. In the third embodiment, a pressure sensor is disposed in the rear of the touch panel 102B of the portable terminal 100. The portable terminal 100 allows the pressure sensor to detect a pressure (which is also called pressing force) generated when the touch screen 102 is pushed with a finger or the like, and determines whether a push operation on the touch screen 102 is performed based on the detection of the pressure. The push operation refers to an operation of pushing a touch screen with a finger.

Hereinafter, the portable terminal 100 according to the third embodiment is referred to as a portable terminal 100x to distinguish the portable terminal 100x from the portable terminal according to the first and second embodiments.

3-1. Hardware Configuration of Portable Terminal

Figure 17:
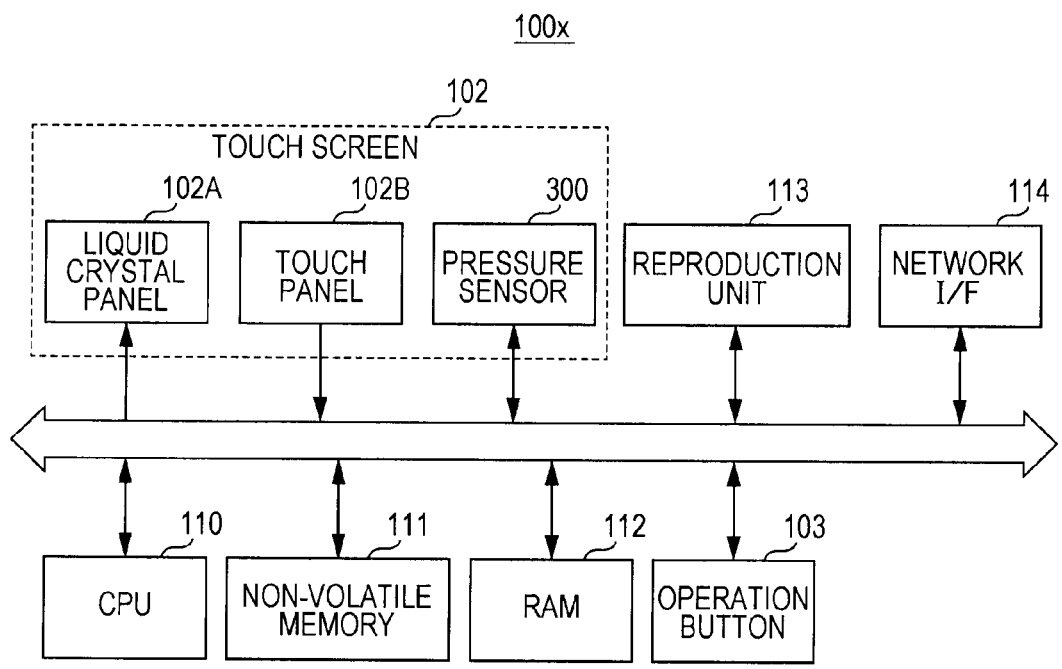
FIG. 17 is a block diagram illustrating the hardware configuration of a portable terminal according to a third embodiment.

First, the hardware configuration of the portable terminal 100x will be described with reference to FIG. 17. Since the outer configuration of the portable terminal 100x is the same as that of the portable terminal 100 according to the first and second embodiments, the outer configuration of the portable terminal 100x will be described with reference to the first embodiment.

Since the portable terminal 100x has a hardware configuration in which a pressure sensor 300 is added to the portable terminal 100, the hardware configuration except for the pressure sensor 300 is the same as that of the portable terminal 100 according to the first and second embodiments. Therefore, the pressure sensor 300 will be mainly described below.

For example, the pressure sensor 300 is disposed between the touch panel 102B and the liquid crystal panel 102A and outputs values, for example, from 0 to 255 (which are called pressure values) in response to the pressing force against the touch screen 102.

The CPU 110 detects the pressure value obtained from the pressure sensor 300. When the pressure value increases and exceeds the threshold value, the CPU 110 determines that pressing on the operation surface starts. Thereafter, when the pressure value decreases and becomes equal to or less than the threshold value, the CPU 110 determines that the pressing ends.

When the CPU 110 determines that the pressing ends, the CPU 110 recognizes that the pressing operation on the touch screen 102 is performed, receives the push operation as an input operation, and thus performs a process according to this input operation.

Specifically, for example, the push operation recognized by the CPU 110 includes an operation of pushing an arbitrary region of the touch screen 102 with a finger. Hereinafter, this operation is also referred to as a push tapping.

In the third embodiment, the input operation performed by the tap described according to the first and second embodiments is substituted by the input operation performed by the push tapping.

That is, for example, suppose that a user performs the push tapping on a browser icon when the browser icon is displayed on the touch screen 102.

Then, the CPU 110 receives the push operation as an input operation of activating the web browser and activates the web browser.

For example, suppose that a user performs the push tapping on one of a plurality of keys of a software keyboard when the software keyboard is displayed on the touch screen 102.

Then, the CPU 110 receives the push operation as an input operation of inputting the character corresponding to the key subjected to the push tapping and displays the character on the liquid crystal panel 102A.

In the portable terminal 100x, various operations (touch operation, push operation and the like) are predicted based on the movement of a finger touching the touch screen 102 and the variation in the pressing force by a finger, and the processes according to the various operations starts.

Hereinafter, the prediction of the various operations will be described in detail.

3-2. Prediction of Various Operations

Hereinafter, a case will be first described in which the push tapping which is one of the push operations is predicted based on the movement of a finger touching the touch panel 102B, that is, a shift in the touch position and a variation in the pressing force against the touch panel 102B.

The touch position is detected as the coordinates on the XY plane of the XYZ space shown in FIG. 6. The pressing force is detected as a pressure value from the pressure sensor 300.

Figure 18:
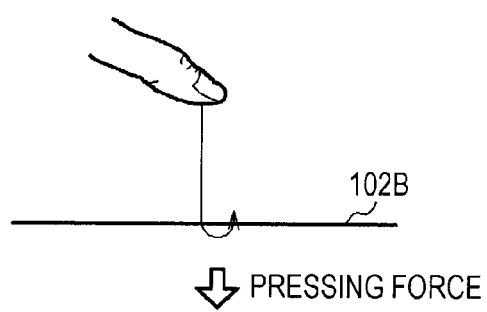
FIG. 18 is a schematic diagram illustrating movement of a finger when push tapping is performed.

In effect, when performing the push tapping on the operation surface of the touch panel 102B, a user pushes an arbitrary region of the operation surface until at least the pressure value exceeds a push threshold value and stops pushing the arbitrary region, as shown in FIG. 18.

Then, the portable terminal 100x predicts that the user performs the push tapping on the operation surface, when detecting the movement caused when the user starts pushing the arbitrary region of the operation surface.

Figure 19:
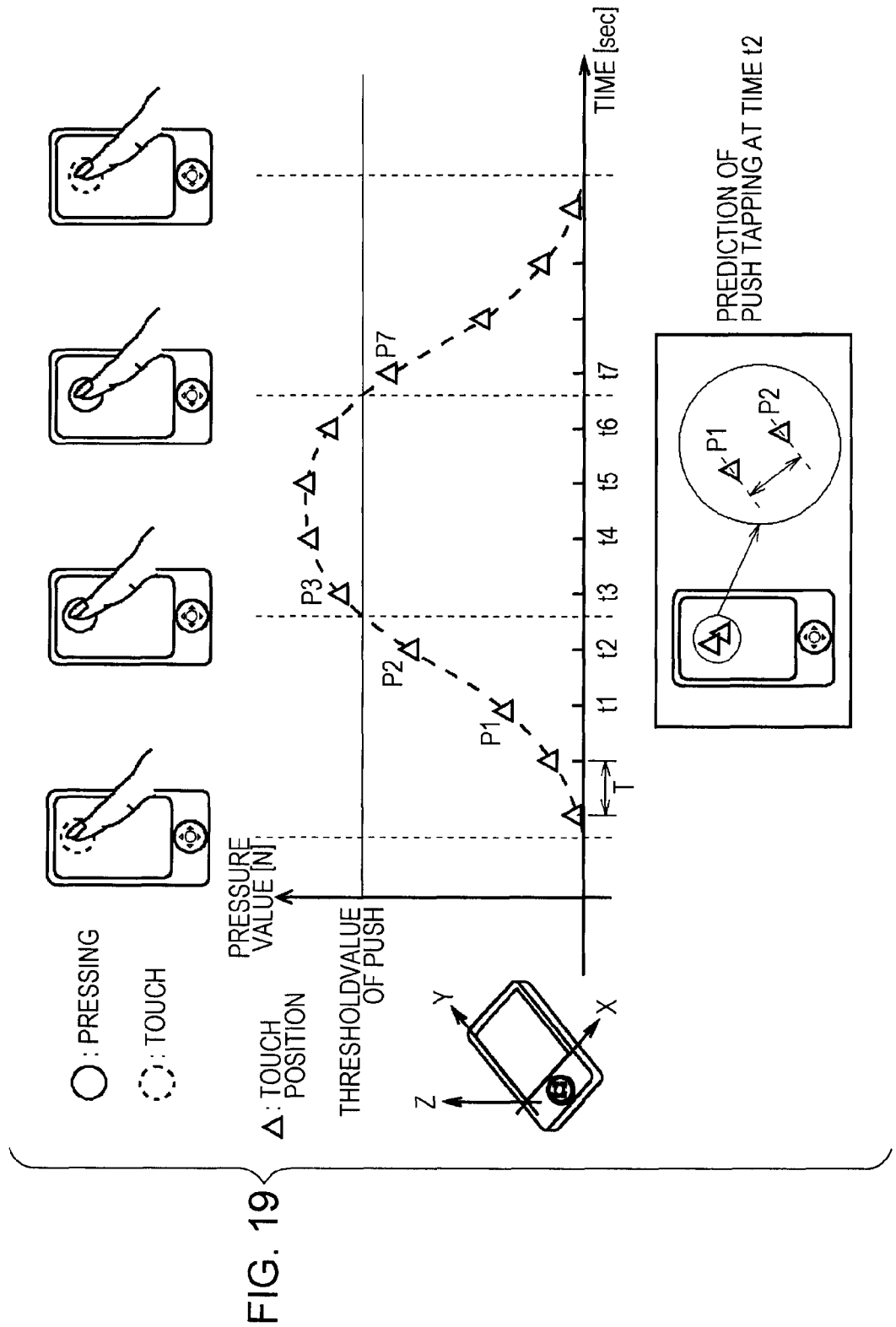
FIG. 19 is a schematic diagram for describing prediction of the push tapping.

Specifically, as shown in FIG. 19, the CPU 110 detects the touch position and the pressure value at the interval of the constant time T. At this time, the CPU 110 calculates a variation amount of pressure value based on the previous pressure value and the current pressure value. This variation amount indicates a variation amount of pressing force within the constant time T.

The CPU 110 calculates a slope (that is, variation amount of pressure value/constant time T) of the pressure value based on the variation amount of pressure value. When the sign of the slope is "+", the slope indicates that the pressure value increases. When the sign of the slope is "−", the slope indicates that the pressure value decreases. The absolute value of the slope indicates a speed at which the pressure value increases or decreases.

Therefore, it can be understood how much rapidly the pressure value increases or decreases from the slope of the pressure value.

Based on the X and Y coordinates of the previous touch position and the X and Y coordinates of the current touch position, the CPU 110 calculates a movement vector on the XY plane (that is, the parallel to the operation surface) of the touch position within the constant time T. The movement vector represents a movement amount and a movement direction of a finger on the operation surface within the constant time T.

That is, it can be understood by which distance the finger is moved in which direction from the movement vector.

Based on the slope of the pressure value within the constant time T and the movement vector on the XY plane obtainable in this way, the CPU 110 determines whether the user starts pushing the arbitrary region on the operation surface.

That is, the CPU 110 determines that the user starts pushing the arbitrary region, when the slope of the pressure value within the constant time T is "+" and the absolute value of the slope is equal to or greater than a predetermined value and the movement amount of the finger on the XY plane is equal to or less than a predetermined amount.

In other words, the CPU 110 determines that the user starts pushing the arbitrary region, when the finger is barely moved in the direction parallel to the operation surface and the pressing force by the finger abruptly increases.

In effect, in the example of FIG. 19, the slope of the pressure value is "+" and the absolute value of the pressure value is equal to or greater than the predetermined value at time t2 at which the touch position P2 is detected after the constant time T elapses from time t1 at which the touch position P1 is detected. In addition, the movement amount of the finger on the XY plane is equal to or less than a predetermined amount.

Therefore, at time t2, the CPU 110 determines that the user starts pushing the arbitrary position and predicts that the position on the operation surface corresponding to the X and Y coordinates of the touch position P2 is subjected to the push tapping. Then, the CPU 110 starts a process corresponding to the push tapping at time t2.

For example, suppose that the link of web pages is displayed at the position on the operation surface corresponding to the X and Y coordinates of the touch position P2.

In this case, when predicting that the link is subjected to the push tapping at time t2, the CPU 110 starts receiving page data of the web pages of the link destination as the BG processing. The CPU 110 sequentially stores the received page data in the RAM 112.

Thereafter, when detecting the touch position P3 at time t3 after the constant time T elapses from time t2, the CPU 110 determines that the operation surface is pushed in that the pressure value at this time exceeds the push threshold value.

The CPU 110 continues the determination when the operation surface is pushed between time t4 to time t6, and then determines that the pushing ends in that the pressure value is equal to or less than the push threshold value when detecting the touch position P7 at time t7 after the constant time elapses from time t6.

The CPU 110 recognizes that the link is actually subjected to the push tapping at time t7. Then, the CPU 110 reads the page data stored in the RAM 112 until time t7 and displays the web pages of the link destination based on the page data on the web browser screen.

In this way, the CPU 110 predicts that the link is subjected to the push tapping, from the shift in the touch position and the variation in the pressing force at time t2 before recognizing that the link is actually subjected to the push tapping, and starts receiving the page data of the link destination.

Thus, it is possible to shorten the period until the web pages of the link destination are displayed from time t7, compared to a case where the page data of the link destination starts to be received at time t7 at which it is recognized that the link is actually subjected to the push tapping, as in the related art.

The CPU 110 does not display the web pages of the link destination until recognizing that the link is actually subjected to the push tapping, although the page data is completely received before the CPU 110 recognizes that the link is actually subjected to the push tapping.

That is, the CPU 110 performs only the BG processing (process of receiving the page data) which can be first performed in the background between processes (process of receiving the page data+process of displaying the web pages) corresponding to the push tapping of the link.

Thus, it is possible to prevent a situation where the web pages of the link destination are displayed although the push tapping of the link is not performed due to the incorrectness of the prediction. Therefore, no disadvantage occurs for the user.

The CPU 110 stops receiving the web pages due to incorrectness of the prediction, for example, when it may not be recognized that the push tapping is actually performed although the predetermined time has elapsed from time t2 at which the push tapping of the link is predicted.

Thus, it is possible to prevent a situation where the process corresponding to the predicted push tapping is unnecessarily continued, irrespective of the incorrectness of the prediction.

Next, a case will be described in which flicking which is one of the touch operations is predicted based on the movement of a finger touching the touch panel 102B, that is, based on the shift in the touch position and the variation in the pressing force against the touch panel 102B.

In this case, the touch position is detected as the coordinates on the XY plane of the XYZ space shown in FIG. 6. The pressing force is detected as a pressure value from the pressure sensor 300.

Figure 20:
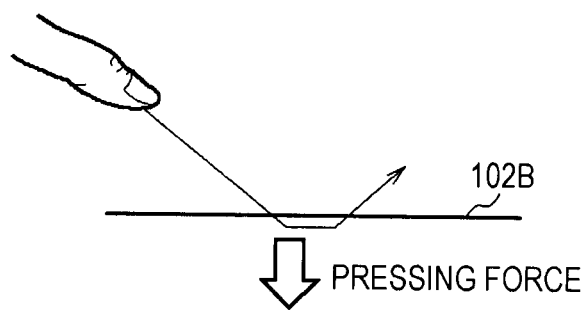
FIG. 20 is a schematic diagram illustrating movement of a finger when flicking is performed.

In effect, when flicking the operation surface, as shown in FIG. 20, a user swiftly performs the process of touching the operation surface with the finger, sliding the finger on the operation surface, and then detaching the finger from the operation surface. At this time, although the user has no intention, the user pushes the operation surface with his finger touching the operation surface until the user detaches his finger from the operation surface.

Then, when detecting the process of swiftly sliding the finger on the operation surface and detaching the finger from the operation surface, the portable terminal 100 predicts the operation surface is flicked (that is, predicts that the flicking ends).

Figure 21:
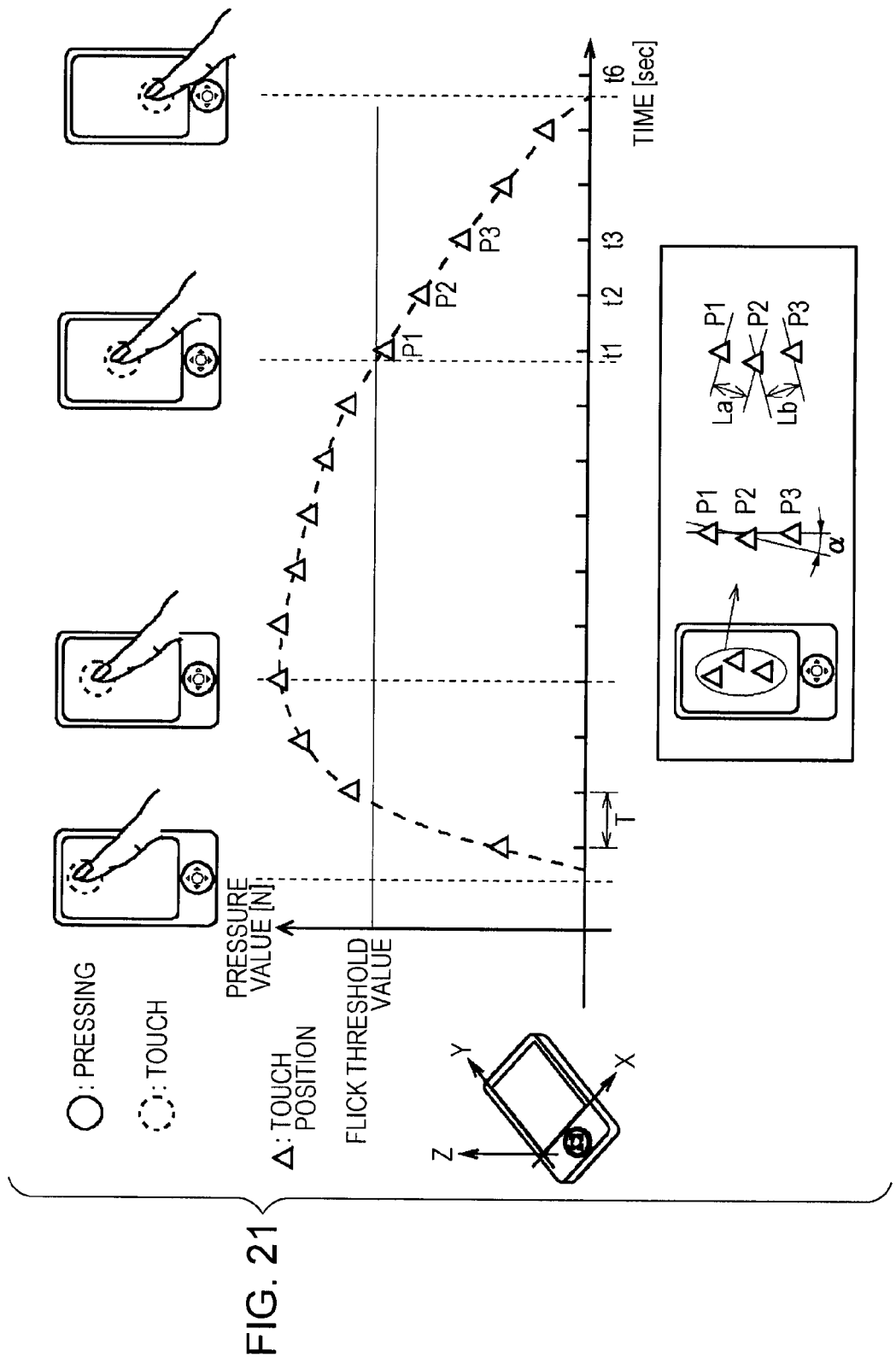
FIG. 21 is a schematic diagram for describing prediction of the flicking using a pressing force.

Specifically, the CPU 110 detects the touch position and the pressure value at the interval of the constant time T like the prediction of the push tapping, as shown in FIG. 21.

Then, based on the touch position and the pressure value obtainable in this way, the CPU 110 determines whether the process of swiftly sliding the finger on the operation surface and detaching the finger is performed.

That is, the CPU 110 determines that the above-described process is performed, when the pressure value once exceeds the flick threshold value expected in the flicking and then decreases down to a value equal to or less than the flick threshold value, and the movement direction of the finger is straight and the movement amount is equal to or greater than a predetermined amount.

In other words, the CPU 110 determines that the process of swiftly sliding the finger and detaching the finger is performed, when the pressing force by the finger becomes weak and the finger touching the operation surface is swiftly moved straightly.

In effect, in the example of FIG. 21, the pressure value becomes a value equal to or less than the flick threshold value at time t1 at which the touch position P1 is detected, and then the pressure value gradually decreases.

After time t1 at which the pressure value becomes the value equal to or less than the flick threshold value (that is, the pressing force becomes weak), the CPU 110 determines whether the movement direction of the finger is straight and the movement amount is equal to or greater than the predetermined amount, based on the shift in the touch position.

Specifically, the CPU 110 calculates a movement vector from the touch position P1 at time t1 to the touch position P2 at time t2 and calculates a movement vector from the touch position P1 to the touch position P3 at time t3.

From the two movement vectors, the CPU 110 obtains an angle α formed by the movement direction from the touch position P1 to the touch position P2 and a movement direction from the touch position P2 to the touch position P3.

From the coordinates of the touch positions P1, P2, and P3, the CPU 110 obtains a movement amount La between the touch positions P1 and P2 and a movement amount Lb between the touch positions P2 and P3.

Here, when the angle α falls within a predetermined range (for example, a range from −15 degrees to +15 degrees) and thus both the movement amounts La and Lb are an amount equal to or greater than a predetermined amount, it means that the finger touching the operation surface is swiftly moved straightly.

In effect, in the example of FIG. 21, the angle α falls within the predetermined range at time t3 and both the movement amounts La and Lb are equal to or greater than the predetermined amount.

Therefore, the CPU 110 determines that the process of swiftly sliding the finger and detaching the finger at time t3 is performed, and thus predicts that the flicking is performed in the direction (that is, the movement direction from the touch position P2 to the touch position P3) indicated by the movement vector. Then, the CPU 110 starts the process corresponding to the flicking from time t3.

For example, suppose that an arbitrary image is displayed on the liquid crystal panel 102A. In this case, at time t3, the CPU 110 starts reading the image data as the BG process, when predicting that the flicking is performed in the direction indicated by the movement vector.

Here, the CPU 110 starts reading the image data corresponding to the previous image of an image being displayed, for example, when predicting that the upward flicking is performed on the operation surface. Alternatively, the CPU 110 starts reading the image data corresponding to the subsequent image of an image being displayed, for example, when predicting that the downward flicking is performed on the operation surface. Then, the CPU 110 sequentially stores the read image data in the RAM 112.

Thereafter, when recognizing that the finger becomes distant from the operation surface at time t6 later than time t3, the CPU 110 considers that the flicking is actually performed in an arbitrary direction.

Then, the CPU 110 reads the image data stored in the RAM 112 until time t6 and displays the images based on the image data on the liquid crystal panel 102A as the FG processing.

In this way, the CPU 110 predicts that the flicking is performed in an arbitrary direction, from the movement and pressing force of the finger touching the operation surface, at time t3 before the flicking actually ends in the arbitrary direction and starts reading the image data.

Thus, it is possible to shorten the period until the previous or subsequent image is displayed from time t6 at which the flicking is actually performed, compared to a case where the image data starts to be read at time t6 at which the flicking is actually performed, as in the related art.

The CPU 110 does not display the images until the flicking is actually performed, for example, although the image data is completely read before the flicking is actually performed.

That is, the CPU 110 performs only the BG processing (process of reading the image data) which can be first performed in the background between the processes (process of reading the image data+process of displaying the images) corresponding to the flicking.

Thus, it is possible to prevent a situation where the FG processing is performed and thus the subsequent image is displayed although the flicking is not performed due to the incorrectness of the prediction. Therefore, no disadvantage occurs for a user.

Moreover, the CPU 110 stops reading the image data due to the incorrectness of the prediction, for example, when the flicking is not actually performed although the predetermined time elapses from time t3 at which the flicking is predicted.

Thus, it is possible to prevent a situation where the process corresponding to the predicted flicking is unnecessarily continued, irrespective of the incorrectness of the prediction.

Next, a case will be described in which dragging which is one of the touch operations is predicted based on the shift in the touch position and the variation in the pressing force.

Figure 22:
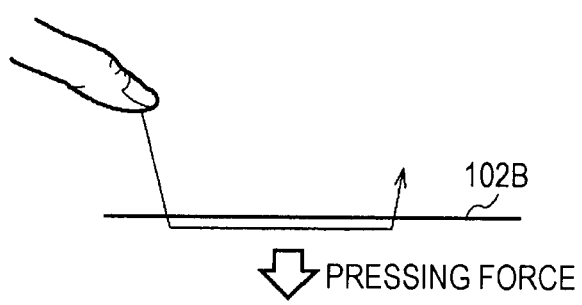
FIG. 22 is a schematic diagram illustrating movement of a finger when dragging is performed.

In effect, when the user drags the operation surface, as shown in FIG. 22, the user performs a process of touching the operation surface with his finger, sliding the operation surface with his finger, and then detaching his finger from the operation surface. At this time, although the user has no intention, the user pushes the operation surface with his finger touching the operation surface until the user detaches his finger from the operation surface.

The dragging is substantially the same as the flicking, but the maximum value of the pressing force is smaller in the dragging than in the flicking since the speed at which the finger slides is slowed. In the dragging, the shift in the touch position immediately before the detachment of the finger is small since the finger is finally detached at a desired position.

The portable terminal 100 predicts that the dragging is performed on the operation surface (that is, predicts that the dragging ends), when detecting that the user slides his finger on the operation surface and then detaches his finger at an arbitrary position.

Figure 23:
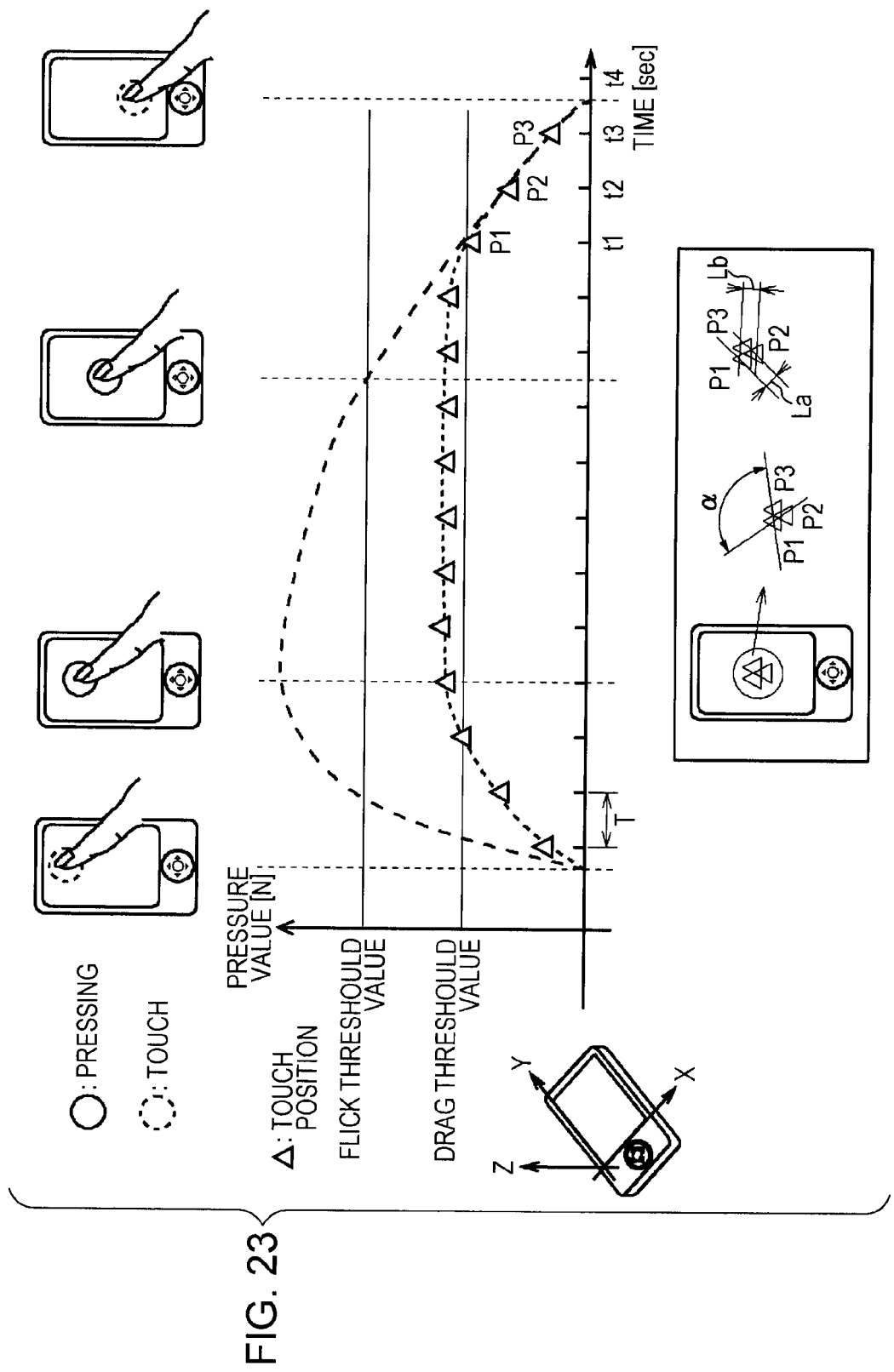
FIG. 23 is a schematic diagram for describing prediction of the dragging using a pressing force.

Specifically, as shown in FIG. 23, the CPU 110 detects the touch position and the pressure value at the time of the constant time T, like the prediction of the flicking.

Then, based on the touch position and the pressure value obtainable in this way, the CPU 110 determines whether the process of sliding the finger on the operation surface and detaching the finger at the arbitrary position is performed.

That is, the CPU 110 determines that the above-described process is performed, when the pressure value once exceeds the drag threshold value (<flicking threshold value) expected in the dragging and then decreases down to a value equal to or less than the drag threshold value, and the movement of the finger is slight. In order to distinguish the dragging from the push tapping, a condition is set in which the movement amount of the touch position becomes equal to or greater than a predetermined amount from when the pressure value exceeds the drag threshold value to when the pressure value becomes a value equal to or less than the drag threshold value.

In other words, the CPU 110 determines that the process of sliding the finger and then detaching the finger at the arbitrary position is performed, when the pressing force by the finger becomes weak and the finger touching the operation surface is scarcely moved.

In effect, in the example of FIG. 23, the pressure value becomes a value equal to or less than the drag threshold value at time t1 at which the touch position P1 is detected, and then the pressure value gradually decreases.

After time t1 at which the pressure value becomes the value equal to or less than the drag threshold value (that is, the pressing force becomes weak), the CPU 110 determines whether the movement of the finger is slight, based on the shift in the touch position.

Specifically, the CPU 110 calculates a movement vector from the touch position P1 at time t1 to the touch position P2 at time t2 and calculates a movement vector from the touch position P1 to the touch position P3 at time t3.

From the two movement vectors, the CPU 110 obtains an angle $\alpha$ formed by the movement direction from the touch position P1 to the touch position P2 and a movement direction from the touch position P2 to the touch position P3.

From the coordinates of the touch positions P1, P2, and P3, the CPU 110 obtains a movement amount La between the touch positions P1 and P2 and a movement amount Lb between the touch positions P2 and P3.

Here, when the angle $\alpha$ exceeds a predetermined range (for example, a range from −15 degrees to +15 degrees) and thus both the movement amounts La and Lb are less than the predetermined amount, it means that the finger touching the operation surface is scarcely moved.

In effect, in the example of FIG. 23, the angle $\alpha$ exceeds the predetermined range at time t3 and both the movement amounts La and Lb are less than the predetermined amount.

Therefore, the CPU 110 determines that the process of sliding the finger and detaching the finger at the arbitrary position at time t3 is performed, and thus predicts that the dragging is performed at the touch position. Then, the CPU 110 starts the process corresponding to the dragging from time t3.

Even in this case, the CPU 110 starts only the BG processing among the processes corresponding to the dragging at the touch position at this time.

Thereafter, when recognizing that the finger becomes distant from the operation surface at time t4 later than time t3, the CPU 110 considers that the dragging is actually performed in an arbitrary direction. Then, the CPU 110 starts the FG processing from time t4.

In this way, the CPU 110 predicts that the dragging is performed, from the movement and pressing force of the finger touching the operation surface, at time t3 before the dragging actually ends and starts the BG processing corresponding to the dragging.

Thus, it is possible to shorten the period until the process ends from time t4 at which the dragging is actually performed, compared to a case where the process corresponding to the dragging starts at time t4 at which the dragging is actually performed, as in the related art.

The CPU 110 does not start the FG processing until the dragging is actually performed, for example, although the BG processing is completely performed before the dragging is actually performed.

Thus, it is possible to prevent a situation where the FG processing is performed although the dragging is not performed due to the incorrectness of the prediction. Therefore, no disadvantage occurs for a user.

Moreover, the CPU 110 stops reading the image data due to the incorrectness of the prediction, for example, when the dragging is not actually performed although the predetermined time elapses from time t3 at which the dragging is predicted.

Thus, it is possible to prevent a situation where the process corresponding to the predicted dragging is unnecessarily continued, irrespective of the incorrectness of the prediction.

Next, a case will be described in which push tapping on a key of the software keyboard displayed on the touch screen 102 is predicted based on the shift in the touch position and the variation in the pressing force.

As in the second embodiment, the CPU 110 of the portable terminal 100x displays the character input screen 200 shown in FIG. 13 as a screen used to input characters on the liquid crystal panel 102A.

The character input screen 200 includes the character display area 200A where input characters are displayed, the conversion candidate display area 200B where character conversion candidates are displayed, and the key display area 200C where a software key board is displayed.

On the key display area 200C, a plurality of keys arranged in a QWERTY form is displayed as a software keyboard.

When one of the keys displayed in the key display area 200C is subjected to push tapping on the character input screen 200, the character corresponding to this key is displayed in the character display area 200A.

When a key is subjected to push tapping on the character input screen 200, the conversion candidates including the character corresponding to the key are displayed in the conversion candidate display area 200B.

When one of the conversion candidates displayed on the conversion candidate display area 200B is subjected to push tapping before the input of the character displayed in the character display area 200A is confirmed, this conversion candidate is displayed in the character display area 200A.

When the character input screen 200 is displayed on the liquid crystal panel 102A, the CPU 110 predicts the push tapping of a key based on the shift in the touch position and the variation in the pressing force.

In effect, when inputting a sentence, a user repeats a process of swiftly moving the finger onto a desired key while touching the operation surface of the touch panel 102B, pushing the key from when the pressure value at least exceeds the push threshold value to when the pushing ends.

When the movement speed of the finger in the direction parallel to the operation surface is slowed and the user starts pushing the key with his finger, the portable terminal 100 predicts that the user performs the push tapping on the key.

Figure 24:
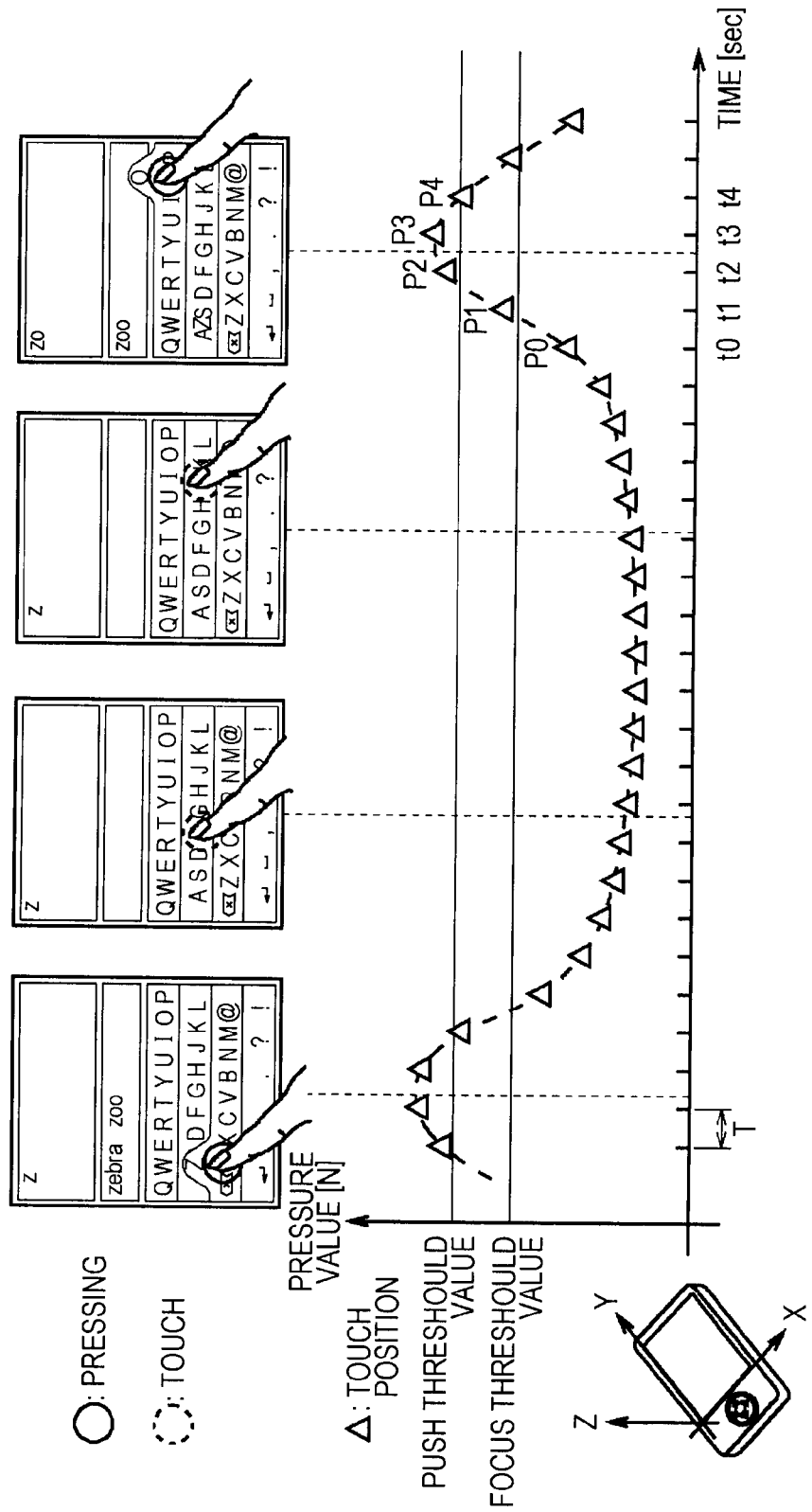
FIG. 24 is a schematic diagram for describing prediction of key touch using a pressing force.

Specifically, the CPU 110 detects the touch position and the pressure value at the interval of the constant time T, as shown in FIG. 24.

The CPU 110 calculates the movement vector of the touch position on the XY plane within the constant time T based on the X and Y coordinates of the previous touch position and the X and Y coordinates of the current touch position. The movement vector indicates the movement amount (that is, the movement speed Vxy) and the movement direction of the finger within the constant time T. That is, from the movement vector, it can be understood how fast the finger is currently moved in which direction on the operation surface.

Based on the pressure value and the movement vector obtainable in this way, the CPU 110 determines whether the movement speed of the finger in the direction parallel to the operation surface is slowed and the process of starting pushing the key is performed.

That is, the CPU 110 determines that the above-described process is performed, when the movement speed Vxy of the finger is equal to or less than a predetermined value and the pressure value exceeds a predetermined value (which is referred to as a focus threshold value and set to be smaller than the push threshold value).

In effect, in the example of FIG. 24, the movement speed Vxy of the finger is equal to or less than the predetermined value and the pressure value exceeds the focus threshold value at time t1 at which the touch position P1 is detected.

Therefore, the CPU 110 determines that the movement speed of the finger in the direction parallel to the operation surface is slowed and the process of starting pushing the key is performed at time t1, and predicts that the key is subjected to the push tapping.

The CPU 110 specifies which key is subjected to the push tapping based on the movement vector from the previous touch position P0 to the current touch position P1 and the X and Y coordinates of the current touch position P1.

Specifically, the CPU 110 specifies the key, for example, in a case where when the movement speed Vxy at this time is less than the set value, the key at the position corresponding to the X and Y coordinates of the current touch position P1 is subjected to the push tapping. On the other hand, the CPU 110 specifies the key, for example, in a case where when the movement speed Vxy at this time is equal to or greater than the set value, one of the keys located an extended line of a line segment between the previous touch position P0 and the current touch position P1 is subjected to the push tapping based on the movement speed Vxy.

In this way, the CPU 110 specifies the key subjected to the push tapping in consideration of the movement speed Vxy of the finger.

Then, the CPU 110 starts the process corresponding to the push tapping of the key from time t1.

Specifically, the CPU 110 starts a process of focusing on the key predicted to be subjected to the push tapping and a process of searching the conversion candidates including the character corresponding to the key from the dictionary data stored in the non-volatile memory 111. Then, the CPU 110 sequentially stores the conversion candidates obtained through the search in the RAM 112.

Thereafter, when detecting the touch position P2 at time t2 later than time t1, the CPU 110 determines that the pressure value exceeds the push threshold value at this time and thus the operations surface is pushed.

Moreover, when detecting the touch position P4 at time t4 later than time t2, the CPU 110 determines that the pressure value at this time is equal to or less than the push threshold value and thus the pushing ends.

The CPU 110 recognizes that the key is actually subjected to the push tapping at time t4.

Then, the CPU 110 displays the character corresponding to the key subjected to the push tapping in the character display area 200A, and simultaneously reads the conversion candidates stored in the RAM 112 and displays the conversion candidates in the conversion candidate display area 200B.

In this way, the CPU 110 predicts that the key is subjected to the push tapping, from the movement of the finger touching the operation surface and the variation in the pressing force, at time t1 before the key is actually subjected to the push tapping, and then starts the focusing process and the process of searching the conversion candidates.

Thus, it is possible to shorten the period until the process ends from time t4 at which the key is actually subjected to push tapping, compared to a case where the process start at time t4 at which the key is actually subjected to push tapping.

Moreover, the CPU 110 does not focus on the key, as long as the movement speed Vxy of the finger in the direction parallel to the operation surface exceeds the predetermined value although the pressure value exceeds the focus threshold value.

That is, when the operation surface is pushed with the finger but the finger is swiftly moved in the direction parallel to the operation surface, it is configured that the key is not focused although the finger passes above the key.

Thus, it is possible to prevent all the keys present along the movement path from being focused, for example, when a user performs the push tapping on a given key and slides his finger up to the key to be subsequently subjected to the push tapping.

However, in some cases, the pressure value is equal to or less than the focus threshold value and the movement speed Vxy of the finger in the direction parallel to the operation surface is equal to or less than the predetermined value, that is, the movement speed of the finger in the direction parallel to the operation surface is slowed but the operation surface is not pushed with the finger. In these cases, it is not concluded that the key is subjected to the push tapping, but it is considered that there is a possibility that the key is subjected to the push tapping.

At this time, the CPU 110 starts only the process (that is, BG processing) of searching the conversion candidates including the character corresponding to the key at the position corresponding to the X and Y coordinates of the touch position from the dictionary data. The CPU 110 does not perform the focusing process (that is, FG processing).

As described above, the portable terminal 100x predicts that the user terminates the operation such as the push tapping or the flicking and starts the corresponding process before the user terminates the operation, based on the shift in the touch position and the variation in the pressing force.

Thus, it is possible to shorten the period from when the operation such as push tapping or flicking is actually performed to when the corresponding process ends, compared to a case where the operation such as push tapping or flicking actually ends and then the corresponding process starts, as in the related art.

3-3. Operation Prediction Processing Order

Next, a specific processing order (operation prediction processing order) when the portable terminal 100x predicts various operations will be described.

Figure 25:
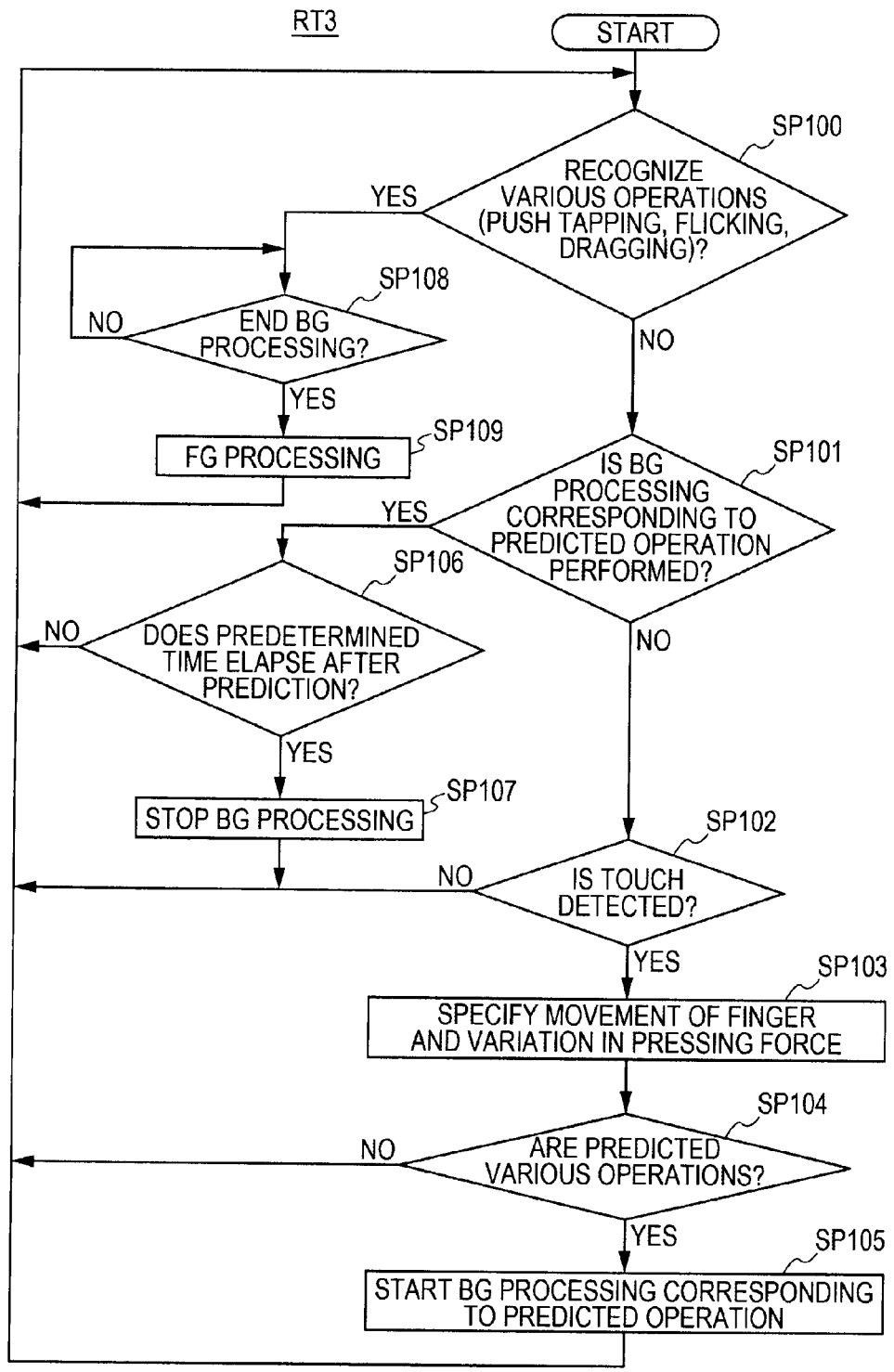
FIG. 25 is a flowchart illustrating operation prediction processing order (1) according to the third embodiment.

An operation prediction processing order RT3 when the push tapping, the flicking, and the dragging described above are predicted will be first described with reference to the flowchart shown in FIG. 25.

The operation prediction processing order RT3 is order in which the CPU 110 of the portable terminal 100x executes processing according to a program stored in the non-volatile memory 111.

For example, the CPU 110 starts the operation prediction processing order RT3 when the portable terminal 100x is turned on, and allows the process to proceed to step SP100. In step SP100, the CPU 110 determines whether the various operations (the push tapping, the flicking, and the dragging) on the touch panel 102B are actually performed.

When the various operations on the touch panel 102B are not actually performed and thus the negative result is obtained in step SP100, the CPU 110 allows the process to proceed to step SP101.

In step SP101, the CPU 110 determines whether the BG processes corresponding to the predicted various operations are currently performed.

When the BG processes corresponding to the predicted various operations are not performed and thus the negative result is obtained in step SP101, the CPU 110 allows the process to proceed to step SP102.

In step SP102, the CPU 110 determines whether the touch of the finger with the touch panel 102B is detected.

When the touch of the finger is detected and thus the positive result is obtained in step SP102, the CPU 110 allows the process to proceed to step SP103.

In step SP103, the CPU 110 specifies the movement of finger touching the operation surface and the variation in the pressing force from the current touch position and pressure value and the previous touch position and pressure value, and then allows the process to proceed to step SP104.

In step SP104, the CPU 110 determines whether the various operations can be predicted from the movement of the finger touching the operation surface and the variation in the pressing force specified in step SP104.

For example, suppose that the push tapping can be predicted from the movement of the finger and the variation in the pressing force specified in step SP104. Then, the CPU 110 obtains the positive result in step SP104 and allows the process to proceed to step SP105.

In step SP105, the CPU 110 starts the BG processing corresponding to the predicted operation and allows the process to return to step SP100.

On the other hand, when the BG processes corresponding to the predicted operations are performed in step SP101 described above and thus the positive result is obtained, the CPU 110 allows the process to proceed to step SP106.

In step SP106, the CPU 110 determines whether a predetermined time elapses after the prediction of the operation.

When the predetermined time does not elapse and thus the negative result is obtained in step SP106, the CPU 110 allows the process to return to step SP100.

On the other hand, when the predetermined time elapses and thus the positive result is obtained in step SP106, the CPU 110 allows the process to proceed to step SP107.

In step SP107, when the predetermined time elapses after the prediction of the operation but the operation is not actually performed, the CPU 110 stops the BG processing corresponding to the predicted operation and allows the process to return to step SP100.

On the other hand, when the various operations are actually performed on the touch panel 102B and thus the positive result is obtained in step SP100 described above, the CPU 110 allows the process to proceed to step SP108.

In step SP108, the CPU 110 awaits termination of the BG processing corresponding to the operation. When the BG processing ends and thus the positive result is obtained in step SP108, the CPU 110 allows the process to proceed to step SP109.

In step SP109, the CPU 110 performs the FG processing subsequent to the BG processing and allows the process to return to step SP100.

When the touch of the finger is not detected and thus the negative result is obtained in step SP102 described above and when the operation is not predicted and thus the negative result is obtained in step SP104 described above, the CPU 110 allows the process to return to step SP100.

According to the operation prediction processing order RT3, the CPU 110 of the portable terminal 100x predicts the various operations (the push tapping, the flicking, and the dragging) and starts the corresponding to BG processing before the various operations are actually performed.

Figure 26:
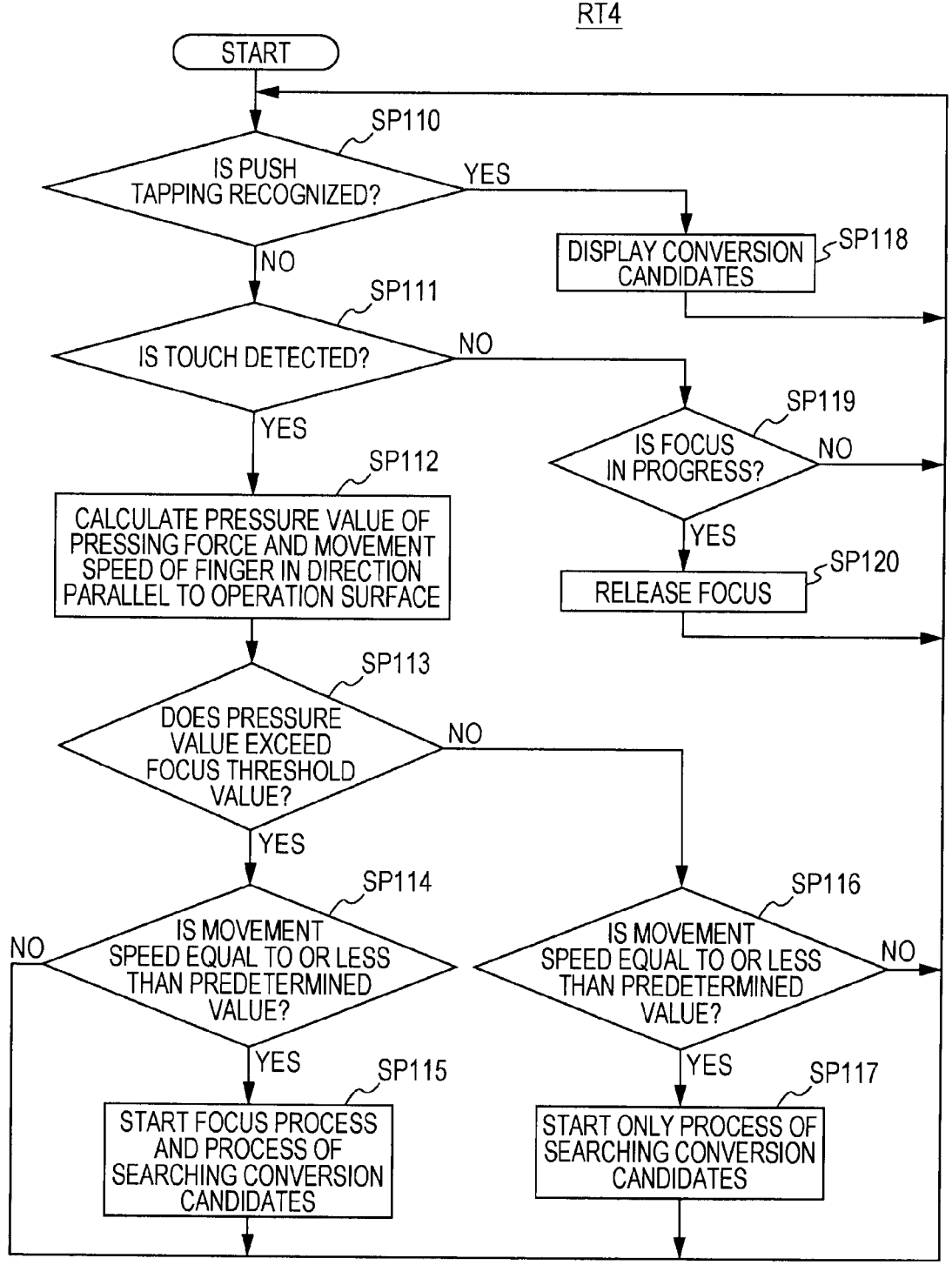
FIG. 26 is a flowchart illustrating operation prediction processing order (2) according to the third embodiment.

An operation prediction processing order RT4 when the push tapping on the keys of the above-described software keyboard is predicted will be subsequently described with reference to the flowchart shown in FIG. 26.

The operation prediction processing order RT4 is also order in which the CPU 110 of the portable terminal 100x executes processing according to a program stored in the non-volatile memory 111.

For example, the CPU 110 starts the operation prediction processing order RT4 when the portable terminal 100x is turned on, and allows the process to proceed to step SP110. In step SP110, the CPU 110 determines whether the push tapping on the key is actually performed.

When the push tapping is not actually performed and thus the negative result is obtained in step SP110, the CPU 110 allows the process to proceed to step SP111.

In step SP111, the CPU 110 determines whether the touch of the finger on the touch panel 102B is detected.

When the touch of the finger is detected and the positive result is obtained in step SP111, the CPU 110 allows the process to proceed to step SP112.

In step SP112, the CPU 110 acquires the pressure value of the pressing force and the movement speed Vxy of the finger in the direction parallel to the operation surface, and allows the process to proceed to step SP113 subsequent to step SP112.

In step SP113, the CPU 110 determines whether the pressure value of the pressing force exceeds the focus threshold value.

When the pressure value of the pressing force exceeds the focus threshold value and thus the positive result is obtained in step SP113, the CPU 110 allows the process to proceed to step SP114.

In step SP114, the CPU 110 determines whether the movement speed Vxy of the finger in the direction parallel to the operation surface is equal to or less than the predetermined value.

When the movement speed Vxy of the finger is equal to or less than the predetermined value and thus the positive result is obtained in step SP114, it meant that the movement speed of the finger in the direction parallel to the operation surface is slowed and thus the process of starting pushing of a key is performed. Then, the CPU 110 allows the process to proceed to step SP115.

In step SP115, the CPU 110 predicts that a specific key is subjected to the push tapping based on the current touch position and the movement speed Vxy of the finger. Then, the CPU 110 starts the process of focusing on the key and the process of searching the conversion candidates including the character corresponding to the key from the dictionary data, and allows the process to return to step SP110.

On the other hand, when the pressure value is equal to or less than the focus threshold value and thus the negative result is obtained in step SP113 described above, the CPU 110 allows the process to proceed to step SP116.

In step SP116, the CPU 110 determines whether the movement speed Vxy of the finger is equal to or less than the predetermined value.

When the movement speed Vxy of the finger is equal to or less than the predetermined value and thus the positive result is obtained in step SP116, it meant that there is a possibility that the key is subjected to the push tapping. Then, the CPU 110 allows the process to proceed to step SP117.

In step SP117, the CPU 110 starts only the process of searching the conversion candidates including the character corresponding to the key from the dictionary data in that there is the possibility that the key at the position corresponding to the X and Y coordinates of the current touch position is touched. Then, the CPU 110 allows the process to return to step SP110.

When the negative result is obtained in step SP114 and in step SP115 described above, the CPU 110 does not perform any process in that there is no possibility that the key is touched, and allows the process to return to step SP110.

On the other hand, when the push tapping on the touch panel 102B is actually performed and thus the positive result is obtained in step SP110 described above, the CPU 110 allows the process to proceed to step SP118.

In step SP118, the CPU 110 reads the conversion characters including the character corresponding to the key subjected to the push tapping from the RAM 112 and displays the conversion characters in the conversion character display area 200B. Then, the process returns to step SP110. At this time, when the process of searching the conversion characters including the character corresponding to the key subjected to the push tapping does not end, the conversion candidates obtained through the search are displayed after this process ends.

On the other hand, when the touch of the finger is not detected and thus the negative result is obtained in step SP111 described above, the CPU 110 allows the process to proceed to step SP119.

In step SP119, the CPU 110 determines whether the key is focused at this time.

When the key is focused and thus the positive result is obtained, it meant that the finger touching the key just until before becomes distant from the operation surface. Then, the CPU 110 allows the process to proceed to step SP120.

In step SP120, the CPU 110 releases the focusing and allows the process to return to step SP110. When the negative result is obtained in step SP119 described above, the CPU 110 allows the process to return to step SP110.

According to the operation prediction processing order RT4, the CPU 110 of the portable terminal 100x predicts that the key is subjected to the push tapping and start the process of focusing on the key and the process of searching the conversion candidates before the key is actually subjected to the push tapping.

3-4. Process and Advantage

According to the above-described configuration, the CPU 110 of the portable terminal 100x notices the shift in the touch position, that is, the movement of the finger touching the touch screen 102 by detecting the touch position at the interval of the constant time T.

The CPU 110 notices the variation in the pressing force by the finger touching the touch screen 102 by detecting the pressure value at the interval of the constant time T.

The CPU 110 predicts the various operations (the push tapping, the flicking, and the dragging) such as a push operation based on the movement of the finger and the variation in the pressing force and starts the process corresponding to the various operations before the various operations are actually performed.

Thus, in the portable terminal 100x, it is possible to shorten the period from when the various operations are actually performed to when the corresponding process ends, compared to the case where the various operations are actually performed and then the processes corresponding to the various operations start.

In the portable terminal 100x having the above-described configuration, it is possible to shorten the period from when the user actually performs the various operations including the push operation to when the corresponding processes end. Therefore, it is possible to further improve the responsiveness to the various operations including the push operation, compared to the related art.

4. Other Embodiments 4-1. Other Embodiment 1

In the above-described first and second embodiments, the movement of the finger approaching the touch panel 102B is specified from the currently detected proximity position and the previously detected proximity position.

Figure 27:
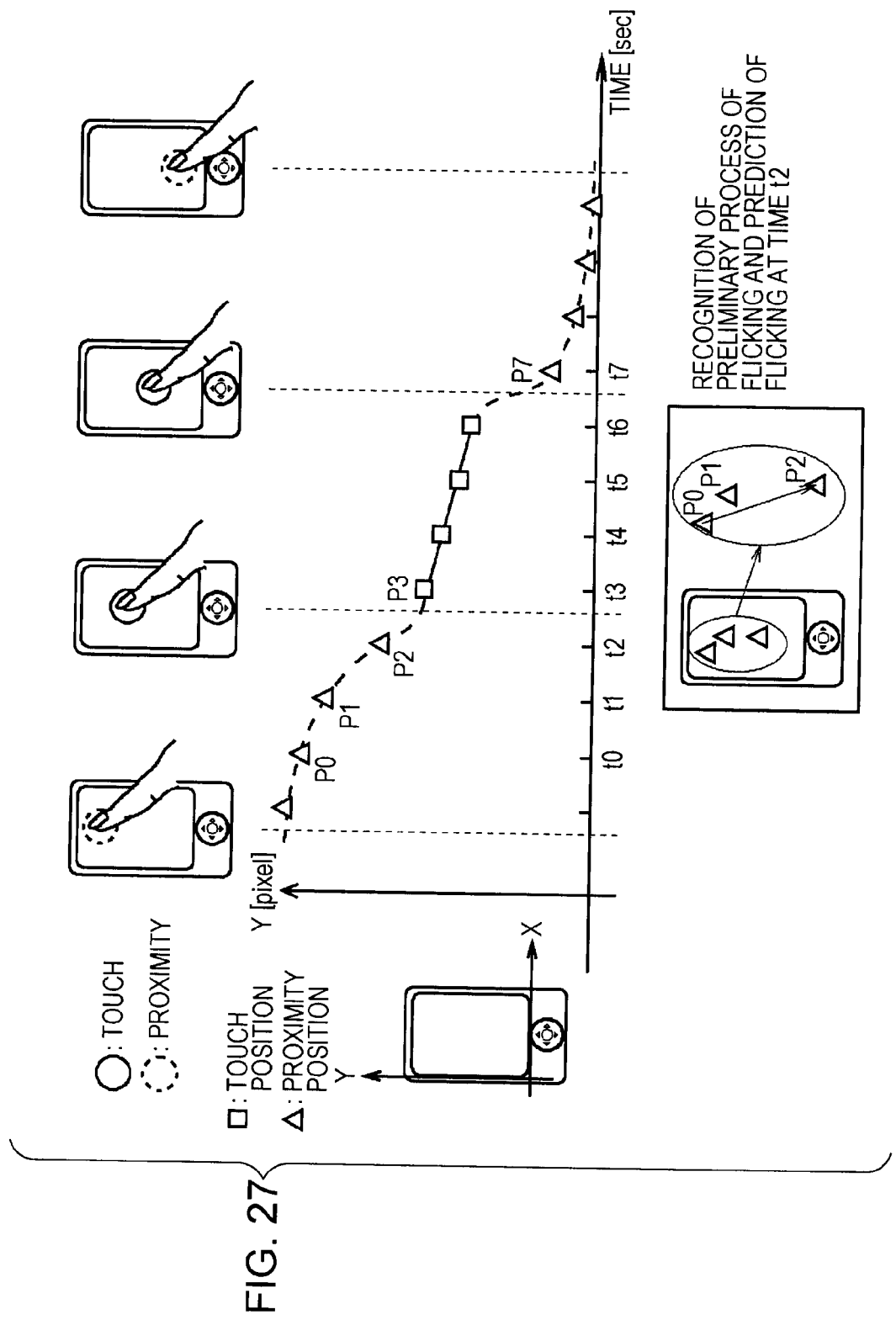
FIG. 27 is a schematic diagram for describing prediction of flicking using a current proximity position and a previous proximity position.

However, the embodiments of the invention are not limited thereto. For example, as shown in FIG. 27, the movement of the finger approaching the touch panel 102B may be specified from the currently detected proximity position P2 and the previously detected proximity position P0.

In effect, when the detection interval (that is, the predetermined time T) between the proximity position and the touch position is short, a difference between the current proximity position and the previous proximity position becomes small. Therefore, it is difficult to specify the movement of the finger.

Therefore, the movement of the finger may be specified from the current proximity position and the last but one position or the earlier previous proximity position, and thus movement of the finger can sometimes be specified more precisely.

4-2. Other Embodiment 2

In the above-described second embodiment, it is determined whether the preliminary process upon touching a key is performed, based on the Z coordinate (that is, the distance between the operation surface and the finger) at the current proximity position and the movement speed Vxy of the finger in the direction parallel to the operation surface.

However, the embodiments of the invention are not limited thereto. In the first embodiment, it may be also determined whether the preliminary process upon touching a key is performed, based on the slope of the Z coordinate of the proximity position within the constant period T and the movement speed Vxy.

In this case, the process in step SP23 of the operation prediction processing order RT2 may be replaced by a process of determining whether the slope of the Z coordinate is "−" and the absolute value is equal to or greater than a predetermined value (that is, whether a finger approaches the operation surface at a speed equal to or faster than a given speed).

4-3. Other Embodiment 3

In the above-described second embodiment, when the touch of a key is predicted, it is determined whether the Z coordinate of the proximity position is equal to or less than the predetermined value and it is determined whether the movement speed Vxy of a finger in the direction parallel to the operation surface is equal to or less than the predetermined value.

However, the embodiments of the invention are not limited thereto. By varying the predetermined value which is the condition of the Z coordinate according to the movement speed Vxy, the touch of a key may be predicted depending on whether the Z coordinate is equal to or less than the varied predetermined value.

For example, as the movement speed Vxy is faster, the predetermined value which is the condition of the Z coordinate may be made to be small.

In this case, when a user moves his finger fast, it is predicted that a key is touched only when the finger and the operation surface become closer. When a user moves his finger slowly, it is predicted that a key is touched even when the finger and the operation surface are somewhat distant from each other.

In this way, since the touch of a key can be predicted sufficiently precisely, the responsiveness to the touch operation can be improved.

4-4. Other Embodiment 4

In the above-described first and second embodiments, tapping, flicking, and touching are predicted as the touch operation from the movement of a finger approaching the touch panel 102B.

However, the embodiments of the invention are not limited thereto. Other various touch operations (for example, dragging, pinch-in, and pinch-out) may be predicted from the characteristic of the movement of a finger immediately before touch.

For example, when two fingers are swiftly moved downward nearly vertically in a state where the two fingers are somewhat distant or when two fingers are swiftly moved downward on a slant so that the fingers become closer to each other, it may be predicted pinch-in is performed.

In this case, when predicting the pinch-in is performed, the CPU 110 starts a process corresponding to the pinch-in.

However, the embodiments of the invention are not limited thereto. The proximity operation may be predicted from the movement of a finger approaching the touch panel 102B.

For example, suppose that the finger approaches the touch panel 102B and a proximity operation of moving the finger just as a circle is depicted with the finger is performed.

Then, the CPU 110 predicts that the proximity operation of moving the finger just as a circle is depicted is performed when the movement speed Vxy of the finger approaching the touch panel 102B is equal to or greater than a predetermined value and the movement locus of the finger forms a part (circular arc) of a circle.

4-5. Other Embodiment 5

The above-described first and second embodiments of the invention are applied to the portable terminal 100 having the electrostatic capacity type touch panel 102B.

However, the embodiments of the invention are not limited thereto. The embodiments of the invention are applicable to an apparatus having an input device for other various operations, such as a touch screen of an optical sensor type having an optical sensor in a liquid crystal panel therein, as long as the device is an input operation device capable of detecting touch and proximity of a finger (instruction object).

The embodiments of the invention are not limited to the input operation device capable of detecting both touch and proximity of a finger. The embodiments of the invention are applicable to apparatuses separately having a device (for example, a pressure-sensitive touch panel) capable of detecting touch of a finger and a device (for example, an infrared sensor) capable of detecting proximity of a finger.

The embodiments of the invention are applicable to apparatuses having various display devices such as an organic EL (Electro Luminescence) panel instead of the liquid crystal panel 102A.

For example, the embodiments of the invention are applicable to a so-called dual-screen portable terminal in which two cases each having a touch screen are connected to each other so as to be opened and closed through a hinge portion.

In this case, the CPU 110 predicts a touch operation on each touch panel from an output value of each of the touch panels of the two touch screens.

The same is applied to the portable terminal 100x according to the above-described third embodiment.

The above-described third embodiment of the invention is applicable to the portable terminal 100x in which the pressure sensor is disposed at the rear of the touch panel 102B.

However, the embodiments of the invention are not limited thereto. The embodiments of the invention is applicable to an apparatus having other various detection devices, as long as the device is a detection device capable of detecting the pressing force on the touch screen 102.

In the above-described third embodiment, the touch and the pressing force of a finger may be detected. Therefore, the embodiment of the invention is applicable to an apparatus having a device capable of detecting only touch of a finger may be used instead of the electrostatic capacity type touch panel 102B.

4-6. Other Embodiment 6

In the above-described second embodiment, when the preliminary process upon touching a key, it is predicted that the key at the position corresponding to the X and Y coordinates of the proximity position at this time is touched.

The embodiment of the invention is not limited thereto. For example, it may be predicted that the key at the position on an extended line of a line segment between the proximity position at this time and the proximity position at the previous time is touched.

4-7. Other Embodiment 7

In the above-described third embodiment, when the pressure value is equal to or less than the focus threshold value, the key is not focused although the key is touched.

The embodiment of the invention is not limited thereto. Even when the pressure value is equal to or less than the focus threshold value but the movement speed Vxy of the finger touching the key is equal to or less than a predetermined value, the key may be focused.

4-8. Other Embodiment 8

In the above-described first and second embodiments, the portable terminal 100 serving as the information processing apparatus 1 includes the touch panel 102B serving as the touch detection unit 2 and the proximity detection unit 3. Moreover, the CPU 110 serving as the control unit 4 of the information processing apparatus 1 is provided.

However, the embodiments of the invention are not limited thereto. As long as the same function is implemented, the respective units of the above-described portable terminal 100 may be configured by various different types of hardware or software.

Moreover, the embodiments of the invention are not limited to the portable terminal 100, but are applicable to various apparatuses such as a digital still camera, a desktop personal computer, a games console, a portable audio player, and a portable phone. The same is applied to the portable terminal 100x according to the third embodiment.

4-9. Other Embodiment 9

In the above-described embodiments, the programs executing various kinds of processing are stored in the non-volatile memory 111 of the portable terminal 100.

However, the embodiments of the invention are not limited thereto. For example, the portable terminal 100 or 100x may be provided with a slot for a storage medium such as a memory card and the CPU 110 may read a program from the storage medium inserted into the slot and execute the program. Moreover, the CPU 110 may install the program read from the storage medium in the non-volatile memory 111. Furthermore, the CPU 110 may download the program from an apparatus on a network via the network I/F 114 and may install the program in the non-volatile memory 111.

The present application contains subject matter related to that disclosed in Japanese Priority Patent Application JP 2010-009181 filed in the Japan Patent Office on Jan. 19, 2010 and Japanese Priority Patent Application JP 2010-199349 filed in the Japan Patent Office on Sep. 6, 2010, the entire contents of which are hereby incorporated by reference.

The invention is not limited to the above-described embodiments and the other embodiments. That is, the invention may be modified in combination forms of parts or the entirety of the above-described embodiments and the other embodiments or partially extracted forms thereof within the scope of the invention.

What is claimed is:

1. An information processing apparatus comprising:
a touch detection unit configured to detect a touch of an instruction object on an operation surface;
a proximity detection unit configured to detect a proximity of the instruction object to the operation surface; and
a control unit configured to detect a movement of the instruction object on or to the operation surface based on a detection result of the touch detection unit and a detection result of the proximity detection unit, to predict an input operation based on the detected movement of the instruction object, and following the prediction, to begin processing the predicted input operation, wherein
the control unit starts background processing among processes corresponding to the input operation following predicting that the input operation will be performed,
a sum of time periods required to perform the background processing and processing other than the background processing equals a perceived responsiveness time, and
the perceived responsiveness time is reduced by a time elapsed between predicting that the input operation will be performed and the performing of the input operation.

2. The information processing apparatus according to claim 1, wherein the control unit predicts that an input operation will be performed by the instruction object based on the detection of a predetermined movement type.

3. The information processing apparatus according to claim 2, wherein the control unit predicts that an input operation of touching the operation surface with the instruction object will be performed when the detected movement of the instruction object is the predetermined movement type.

4. The information processing apparatus according to claim 3, wherein the control unit determines the predetermined movement type based on a movement speed and a movement direction of the instruction object.

5. The information processing apparatus according to claim 4, wherein the control unit predicts that the input operation of touching the operation surface with the instruction object will be performed by determining the instruction object approaches the operation surface in a direction substantially perpendicular to the operation surface at a speed equal to or faster than a predetermined speed.

6. The information processing apparatus according to claim 4, wherein
the control unit predicts that an input operation of flicking the operation surface with the instruction object will be performed by determining the instruction object approaches the operation surface in an inclination direction offset from a normal axis of the operation surface at a speed equal to or faster than a predetermined speed.

7. The information processing apparatus according to claim 4, wherein the control unit determines whether the movement of the instruction object is the predetermined movement type based on the movement speed and the movement direction of the instruction object and a distance between the instruction object and the operation surface.

8. The information processing apparatus according to claim 7, wherein the control unit predicts that the input operation of touching the operation surface with the instruction object will be performed by determining the distance between the instruction object and the operation surface is equal to or less than a predetermined distance and the movement speed of the instruction object to the operation surface is equal to or less than a predetermined speed.

9. The information processing apparatus according to claim 1, wherein the control unit stops the background processing following a predetermined time period during which the predicted input operation is not performed.

10. The information processing apparatus according to claim 1, wherein the control unit performs processing other than the background processing when the predicted input operation is performed.

11. The information processing apparatus according to claim 1, wherein the control unit begins processing the predicted input operation before an actual input corresponding to the predicted input operation is received.

12. The information processing apparatus according to claim 3, wherein the control unit determines the predetermined movement type based on a movement speed or a movement direction of the instruction object.

13. An operation prediction method comprising:
- detecting, by a touch detection unit, a touch of an instruction object on an operation surface;
- detecting, by a proximity detection unit, a proximity of the instruction object to the operation surface;
- detecting, by a control unit, a movement of the instruction object on or to the operation surface based on a detection result of the touch detection unit and a detection result of the proximity detection unit;
- predicting, by the control unit, an input operation based on the detected movement of the instruction object; and
- following the prediction, beginning processing of the predicted input operation by the control unit, wherein
- the control unit starts background processing among processes corresponding to the input operation following predicting that the input operation will be performed,
- a sum of time periods required to perform the background processing and processing other than the background processing equals a perceived responsiveness time, and
- the perceived responsiveness time is reduced by a time elapsed between predicting that the input operation will be performed and the performing of the input operation.

14. A non-transitory computer readable medium having instructions stored therein that when executed by a processor, causes a computer to execute a method of:
- detecting a touch of an instruction object on an operation surface;
- detecting a proximity of the instruction object to the operation surface;
- detecting a movement of the instruction object on or to the operation surface based on a detection result of detecting the touch and the proximity of the instruction object;
- predicting an input operation based on the detected movement of the instruction object; and
- following the prediction, beginning a first processing of the predicted input operation, wherein
- the first processing includes background processing among processes corresponding to the input operation,
- a sum of time periods required to perform the background processing and processing other than the background processing equals a perceived responsiveness time, and
- the perceived responsiveness time is reduced by a time elapsed between predicting that the input operation will be performed and the performing of the input operation.

* * * * *